(12) United States Patent
Kravec et al.

(10) Patent No.: US 7,185,175 B2
(45) Date of Patent: Feb. 27, 2007

(54) CONFIGURABLE BI-DIRECTIONAL BUS FOR COMMUNICATING BETWEEN AUTONOMOUS UNITS

(75) Inventors: Kerry A. Kravec, Fishkill, NY (US); Ali G. Saidi, Ann Arbor, MI (US); Jan M. Slyfield, San Jose, CA (US); Pascal R. Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 10/757,673

(22) Filed: Jan. 14, 2004

(65) Prior Publication Data

US 2005/0154858 A1    Jul. 14, 2005

(51) Int. Cl.
 *G06F 12/00* (2006.01)
(52) U.S. Cl. ..................................... 712/11
(58) Field of Classification Search .................. 712/11; 710/107
See application file for complete search history.

(56) References Cited

U.S. PATENT DOCUMENTS

| | | | | |
|---|---|---|---|---|
| 4,559,618 A * | 12/1985 | Houseman et al. | ........... | 365/49 |
| 5,109,333 A | 4/1992 | Kubota et al. | ............... | 395/275 |
| 5,182,808 A | 1/1993 | Bagnoli et al. | ............. | 395/725 |
| 5,353,416 A | 10/1994 | Olson | ......................... | 395/325 |
| 5,440,715 A * | 8/1995 | Wyland | ....................... | 711/108 |
| 5,548,773 A * | 8/1996 | Kemeny et al. | ............... | 712/11 |
| 5,687,329 A | 11/1997 | Kaiser et al. | ................ | 395/308 |
| 5,754,865 A | 5/1998 | Itskin et al. | ................ | 395/729 |
| 5,787,200 A * | 7/1998 | Scelza et al. | ................ | 382/217 |
| 5,831,997 A * | 11/1998 | Kodashiro | .................. | 714/738 |
| 5,933,614 A | 8/1999 | Tavallaei et al. | ............ | 395/309 |
| 6,127,849 A * | 10/2000 | Walker | ........................ | 326/86 |
| 6,240,485 B1 * | 5/2001 | Srinivasan et al. | ......... | 711/108 |
| 6,629,190 B2 * | 9/2003 | Mattison | ..................... | 711/101 |
| 6,847,346 B2 * | 1/2005 | Kumagai et al. | ............. | 345/98 |

* cited by examiner

*Primary Examiner*—Eric Coleman
(74) *Attorney, Agent, or Firm*—Richard F. Frankeny; Winstead Sechrest & Minick P.C.

(57) ABSTRACT

Processing units (PUs) are coupled with a gated bi-directional bus structure that allows the PUs to be cascaded. Each PUn has communication logic and function logic. Each PUn is physically coupled to two other PUs, a PUp and a PUf. The communication logic receives Link Out data from a PUp and sends Link In data to a PUf. The communication logic has register bits for enabling and disabling the data transmission. The communication logic couples the Link Out data from a PUp to the function logic and couples Link In data to the PUp from the function logic in response to the register bits. The function logic receives output data from the PUn and Link In data from the communication logic and forms Link Out data which is coupled to the PUf. The function logic couples Link In data from the PUf to the PUn and to the communication logic.

38 Claims, 18 Drawing Sheets

PPDE 100 Technical Features

| | |
|---|---|
| Frequency | 0 to 250 MHz |
| Bandwidth | 2Gb/sec at 250 MHz |
| Compute Power | 1.25 TOPS Equivalent |
| Power Consumption | 300mW at 250MHz |
| Power Supply Vlotage | 1.5 V internal (2.5 and 3.3 V compatible) |
| Technology | CMOS .13 Micron |
| I/O Pins | 88 |
| Die Size | 8mm X 8mm |
| Interface | Fexible interface: max. 64 bits at 66 MHz (max. rate: 4Gb/sec) |

FIG. 4

Case 1: Reload if there is NOT a pattern match and the match OPcode is set
Partial expression to match: "ABC"

Case 2: Reload if there is a pattern match and the inverse OPcode is set for a pattern byte
Partial Expression to match : "C!DE"

Case 4: Increment if there is NOT a pattern match and the inverse OPcode is set
Partial expression to match: "I!LK"

Case 5: Increment if there is a pattern match and the match OPcode is set
Partial Expression to match : "LMN"

Case 6: Increment if there is NOT a pattern match and the wildcard OPcode is set
Partial expression to match: "O•Q"

CONFIGURABLE BI-DIRECTIONAL BUS FOR COMMUNICATING BETWEEN AUTONOMOUS UNITS

CROSS REFERENCE TO RELATED APPLICATIONS

The present invention is related to the following U.S. Patent Applications which are incorporated herein by reference:

Ser. No. 10/757187 entitled "Parallel Pattern Detection Engine" filed Jan. 14, 2004; and Ser. No. 10/756904 entitled "Intrusion Detection Using A Network Processor And A Parallel Pattern Detection Engine" filed Jan. 14, 2004.

TECHNICAL FIELD

The present invention relates in general to controlling bi-directional communication between autonomous processing units and in particular to processing units used in pattern recognition and matching.

BACKGROUND INFORMATION

Recognizing patterns within a set of data is important in many fields, including speech recognition, image processing, seismic data, etc. Some image processors collect image data and then pre-process the data to prepare it to be correlated to reference data. Other systems, like speech recognition, are real time where the input data is compared in real time to reference data to recognize patterns. Once the patterns are "recognized" or matched to a reference, the system may output the reference. For example, a speech recognition system may output equivalent text to the processed speech patterns. Other systems, like biological systems, may use similar techniques to determine sequences in molecular strings like DNA.

In some systems, there is a need to find patterns that are imbedded in a continuous data stream. In non-aligned data streams, there are some situations where patterns may be missed if only a single byte-by-byte comparison is implemented. The situation where patterns may be missed occurs when there is a repeated or nested repeating patterns in the input stream or the pattern to be detected. A reference pattern (RP) containing the sequence that is being searched for is loaded into storage where each element of the sequence has a unique address. An address register is loaded with the address of the first element of the RP that is to be compared with the first element of the input pattern (IP). This address register is called a "pointer." In the general case, a pointer may be loaded with an address that may be either incremented (increased) or decremented (decreased). The value of the element pointed to by the pointer is retrieved and compared with input elements (IEs) that are clocked or loaded into a comparator.

In pattern recognition, it is often desired to compare elements of an IP to many RPs. For example, it may be desired to compare an IP resulting from scanning a finger print (typically one kilobyte for certain combinations of features defined in finger print technology) to a library of RPs (all scan results on file). To do the job quickly, elements of each RP may be compared in parallel with elements in the IP. Each RP may have repeating substrings (short patterns) which are smaller patterns embedded within the RP. Since a library of RPs may be quite large, the processing required may be considerable. It would be desirable to have a way of reducing the amount of storage necessary to hold the RPs. If the amount of data used to represent the RPs could be reduced, it may also reduce the time necessary to load and unload the RPs. Parallel processing may also be used where each one of the. RPs and the IP are loaded into separate processing units to determine matches.

Other pattern recognition processing in biological systems may require the comparison of an IP to a large number of stored RPs that have substrings that are repeated. Processing in small parallel processing units may be limited by the storage size required for the RPs. Portable, inexpensive processing systems for chemical analysis, biological analysis, etc., may also be limited by the amount of storage needed to quickly process large numbers of RPs.

Pattern detection or recognition is a bottleneck in many applications today and software solutions cannot achieve the necessary performance. It is desirable to have a hardware solution for matching patterns quickly that is expandable. It is also desirable to have a system that allows multiple modes of pattern matching. Some applications require an exact match of a pattern in an input data stream to a desired target pattern. In other cases, it is desirable to determine the longest match, the maximum number of characters matching, or a "fuzzy" match where various character inclusions or exclusions are needed.

Many types of pattern recognition require a very large pattern or the comparison of a large number of different patterns to a single input data stream. Using small pattern processing units (PUs) that are programmable to do selected pattern matching, allows these units to have high speed processing while also allowing them to be cascaded to do many patterns in parallel or to allow each processing unit to hold a partition of a very large pattern. While input data is coupled to the processing units in parallel, there is a need to communicate selected information between adjacent processing units to share the results of a pattern matching process, indicate when the pointer of a particular processing unit needs to be indexed if the processing unit has a partition of a large pattern, etc. Since a parallel pattern detection engine (PPDE) may be an IC with a large number of these autonomous PUs, there may be many groupings of the PUs, some used for large pattern matching and others used in multiple pattern matching. In these cases, it is desirable to be able to program which of the autonomous PUs have cascade communication between them enabled or disabled. Additionally, it would be desirable to use the cascade communication to allow advanced matching capabilities by using fewer PUs to match complex regular expressions. Wiring issues dictate that the cascade communication be simple because of the large number of pattern processing that may be placed on an IC.

There is, therefore, a need for a method and circuitry to provide bi-directional communication and isolation between autonomous processing units that is simple, programmable and allows advanced matching capabilities.

SUMMARY OF THE INVENTION

Autonomous processing units (PUs) are coupled with a bus like circuit structure that allows the PUs to be cascaded; a PU may communicate with one or preceding PUs or one or more following PUs. Likewise, a PU may be isolated from the other PUs. A minimum of two wires are provided from a PU to preceding PUs and two wires to following PUs. In this manner a particular PU (PUn) can send and receive data to preceding PUs or send and receive data from following PUs. Each PUn has cascade circuitry that has communication logic and function logic. Each PUn is physically coupled to two other PUs, hereafter a preceding PU (PUp) and a forward PU (PUf). The communication logic receives input data (Link Out data) from a PUp and sends output data (Link In data) to a PUf. The communication logic has two register bits (Chain In register bit and Chain Out register bit) for enabling and disabling the transmission of Link Out data and Link In data. The communication logic couples the Link Out data from a PUp to function logic and couples Link In data to the PUp from the function logic in response to the logic states of the Chain In and Chain Out register bits. The function logic in a particular PUn receives output data from the PUn and Link In data from the communication logic and forms Link Out data which couples to the PUf. Likewise, the function logic, in the particular PUn, couples Link In data from the PUf to the PUn and to the communication logic. When the Chain In register bit and the Chain Out register bit in a PUn is set to a logic one, then PUn has enabled bi-directional communication to the PUp to which it is physically connected. If the PUf to which the PUn is physically connected also has its Chain In register bit and Chain Out register bit set to a logic one, then bi-directional communication is enabled between the PUn and the PUf and PUp to which it is physically connected. In this manner, any number of PUs may be linked with bi-directional communication paths. Likewise, any particular PUn may be isolated from the PUf and PUp to which it is physically coupled.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a chart of performance results achievable by an integrated circuit employing 1500 PUs according to embodiments of the present invention;

DETAILED DESCRIPTION

Figure 1:
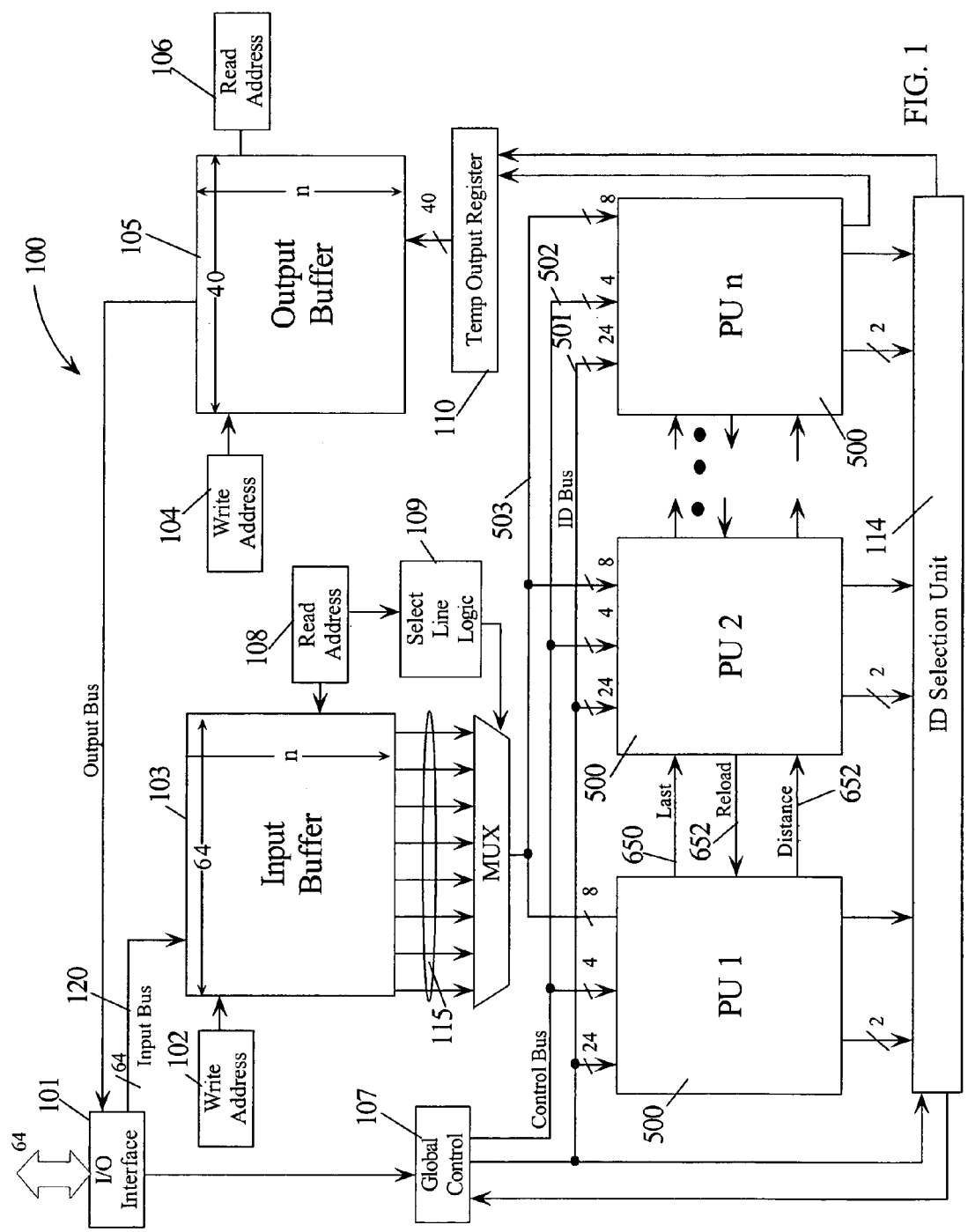
FIG. 1 is a block diagram of the architecture of a parallel pattern detection engine (PPDE) according to embodiments of the present invention comprising N processing units.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Sequential matching of a data stream in software is currently a central processing unit ("CPU") intensive task. Thus, high performance is difficult. A pattern matching processing unit (hereafter PU) architecture may provide high performance matching because it is a piece of hardware dedicated to pattern matching. The PU provides more efficient searching (matching) because every input pattern is being matched in parallel to a corresponding target pattern. Parallel matching is possible because a virtually unlimited number of the PUs may be cascaded. Additionally, each PU has built-in functionality that can reduce the number of necessary PUs by incorporating modes that allow matching comprising wild cards (don't cares in the target pattern), multiple wildcards, and inverse operations. The PU architecture's fast pattern detection capabilities are useful in network intrusion detection, database scanning, and mobile device security applications. Additionally, with their built-in distance computation, "fuzzy" pattern detection may be implemented which are particularly useful in image processing and life sciences applications.

Figure 5:
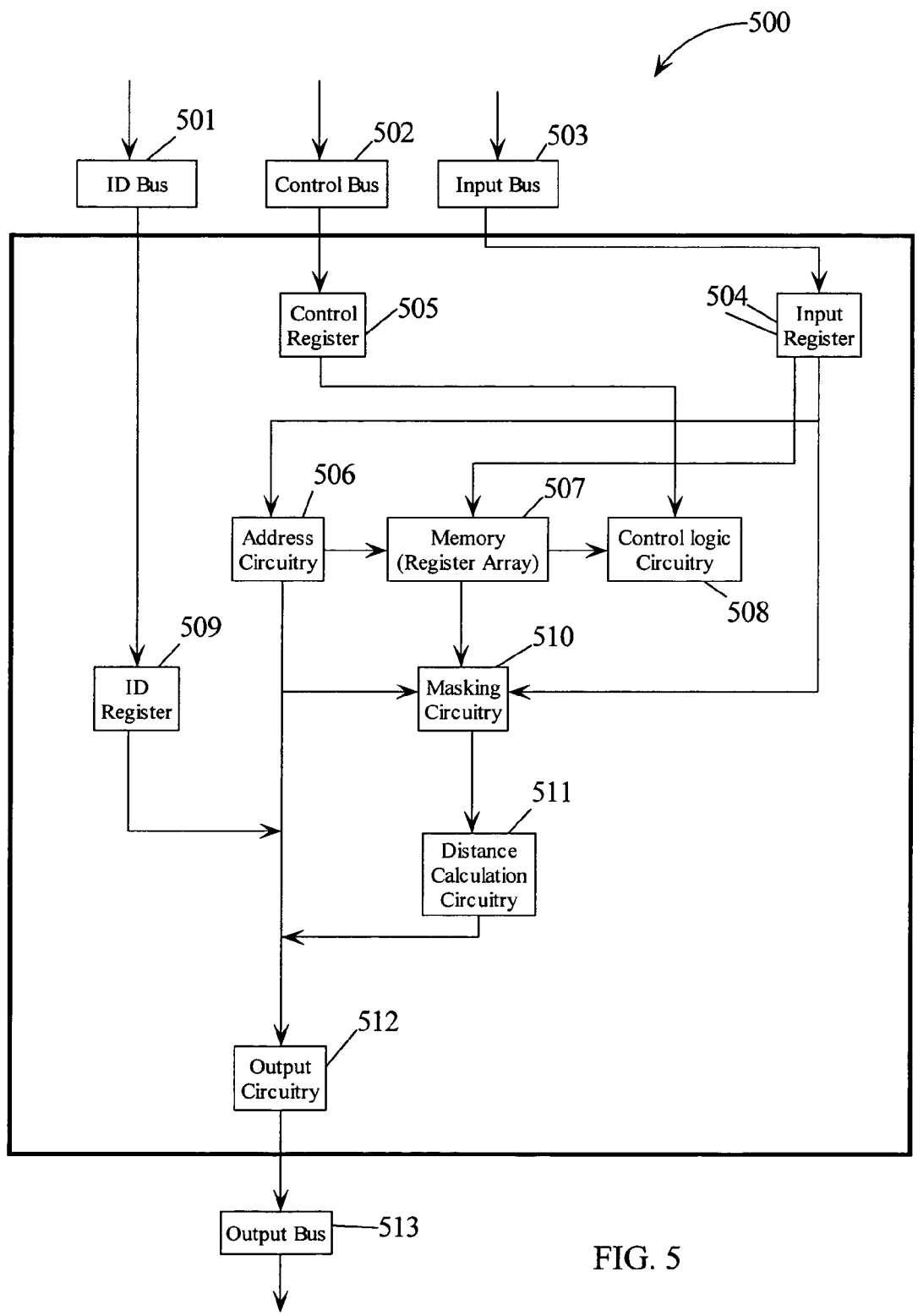
FIG. 5 is an overview block diagram of an individual PU according to embodiments of the present invention.

FIG. 5 is an overview block diagram of a PU 500 according to embodiments of the present invention. PU 500 receives inputs from identification (ID) bus 501, control bus 502 and input data bus 503. The inputs of the buses are buffered in ID register 509, control register 505 and input data register 504. Control data from control register 505 is coupled to control logic circuitry 508 which also receives data from memory 507. Input data from input data register 504 is coupled to memory 507, address circuitry 506, masking circuitry 510. Address circuitry 506 couples addresses to memory 507. Address circuitry 506 also couples to masking circuitry 510 and output circuitry 512. Output circuitry 512 receives data from ID register 509, address circuitry 506 and distance circuitry 511 and selectively couples data to output bus 513.

Figure 6:
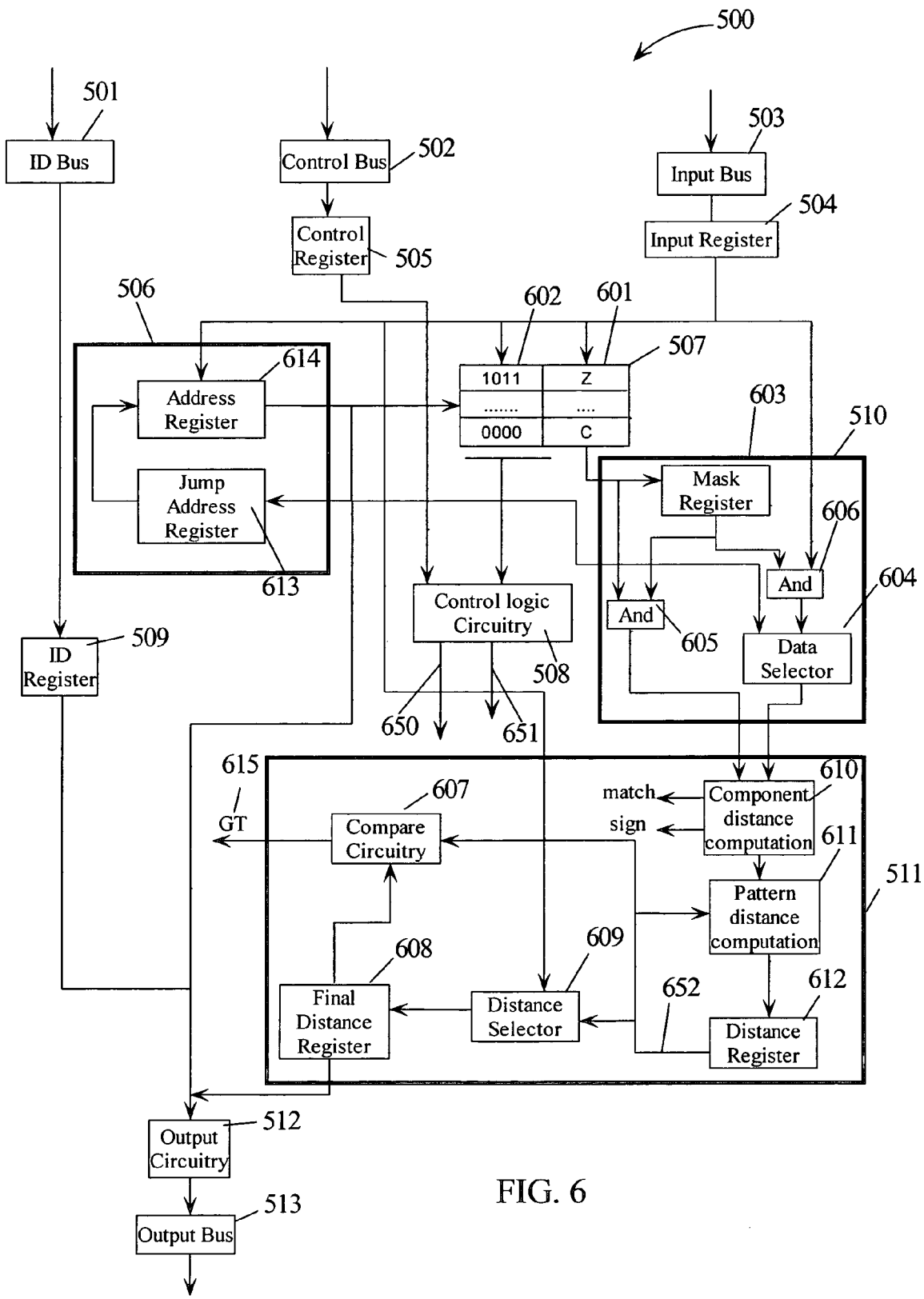
FIG. 6 is a detailed block diagram of an individual PU according to embodiments of the present invention.

FIG. 6 is another more detailed block diagram of PU 500 according to embodiments of the present invention. Blocks shown in FIG. 5 are repeated for clarity. PU 500 receives inputs from identification (ID) bus 501, control bus 502 and input data bus 503. The inputs of the buses are buffered in ID register 509, control register 505 and input data register 504. Memory 507 is a register array having fields for pattern data 601 and operation codes (Opcodes) 602. Memory 507 stores patterns that are being compared to input data. Opcodes 602 define what type of pattern compare is being executed. Opcodes 602 and control bits from control register 505 are coupled to control logic circuitry 508. Pattern data 601 are coupled to mask register 603 in mask circuitry 510. Outputs of mask register 603 are combined in logic AND 605 to generate inputs to component distance computation unit 610 in distance circuitry 511. Likewise, outputs of mask register 603 are combined in a logic AND 606 to form inputs to data selector 604. Data selector 604 selects between input data from input register 504 and addresses from address register 614 to provide inputs to component distance computation unit 610. Address register 614 couples address to memory 507. Component distance computation unit 610 couples outputs to Pattern distance computation unit 611. Present distance computation results are stored in distance register 612. The present distance computation result is coupled back to pattern distance computation unit 611 and to compare circuitry 607. The output of distance register 612 is compared to a value in the final distance register to generate output greater than (GT) 615. GT 615 is set active when the value stored in the final distance register is greater than the value stored in the distance register. The final distance value in store in final distance register 608 is selected from either input register 504 or distance register 612 in distance selector 609.

Each PU 500 has limited memory to store pattern data 601. If a pattern is long, it is possible to merge several PU 500 units for storing a long sequence of pattern data 601. For example if two PU 500 are used, then during the beginning of a pattern detection phase, the memory 507 of the first of the two PU 500 units is used. The address pointer of the first PU 500 is modified according to the matching mode and the operation codes 602. When the address pointer reaches its last memory position a last signal 650 is sent to the second of the two PU 500 units in order to continue the matching process using the remainder of the pattern data 601 stored in the second PU 500. Control data on control bus 502 is used to initialize the second PU 500, in this case, so that it only starts matching when it receives the "last" signal 650 from the first PU 500. Also in this case, if a "reload" pointer address is indicated during the matching process, the address pointer of both of the two PU 500 units used for the long sequence of pattern data 601 must be updated. This is accomplished by sending a "reload" signal 651 to the appropriate PU 500 (containing the initial pattern 601 bytes). Since the number of bytes in a sequence of pattern data 601 is not specifically limited, more than two PU 500 units may be used in the manner discussed. Again initialization control data on control bus 502 configures a PU 500 to execute as an independent PU or as a cascade PU.

When the matching mode is a "fuzzy" match, pattern distance computation unit 611 calculates a present distance value stored in distance register 612. If two or more PU 500 units are used in cascade to store pattern data 601 used for a fuzzy match, then the distance value is sent on distance signal 652 to the next PU 500 in a cascade so that a final distance value may be determined and stored in final distance register 608 of the last PU 500 in a cascade.

Figure 7:
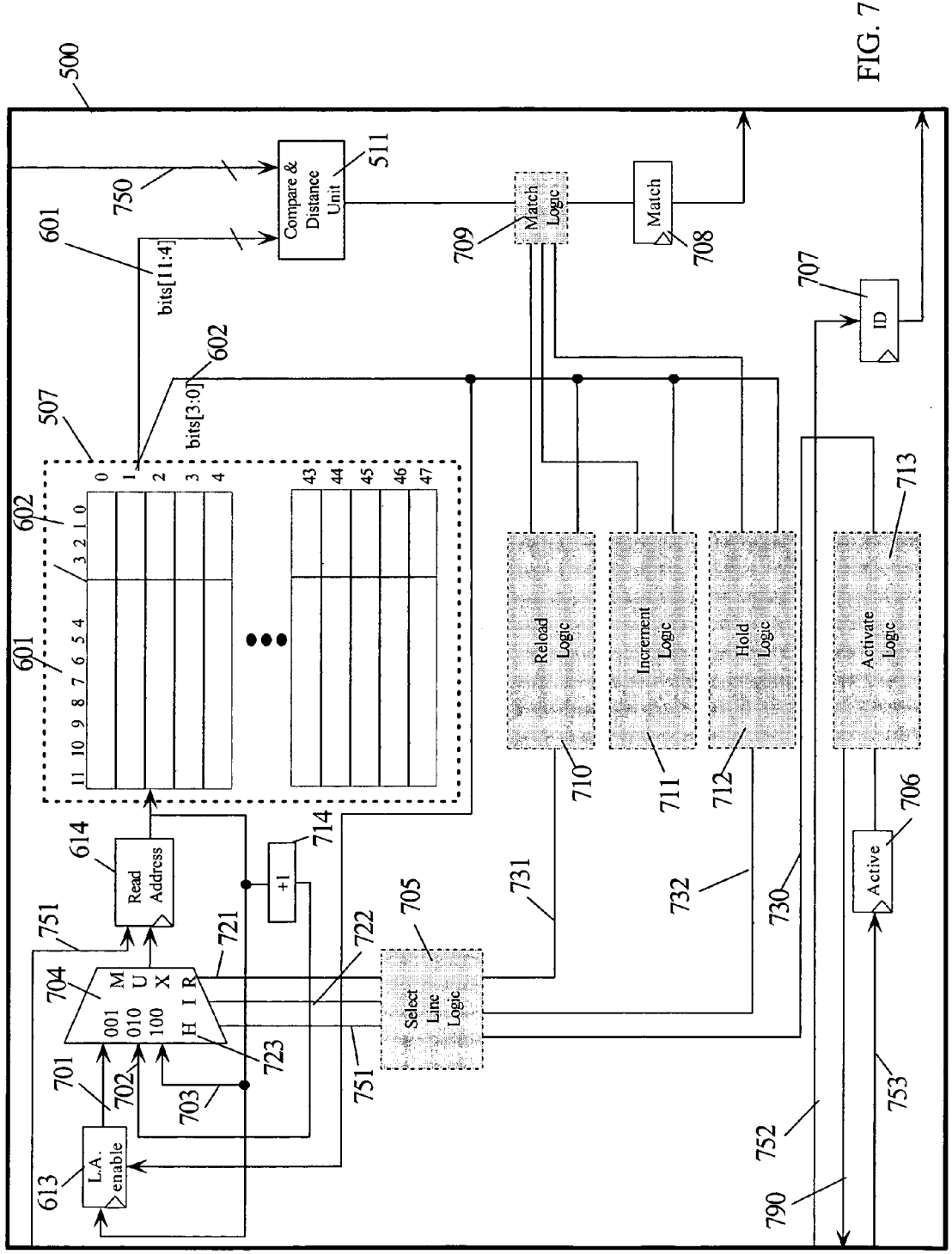
FIG. 7 is a detailed block diagram of a PU architecture.

FIG. 7 is a block diagram of more details of circuitry PU 500. Patterns to be compared are preloaded into memory (register file) 507 as bytes wherein each bit is stored as 8 bits in bits [11:4]. Each Opcode 602 is stored in bits [3:0]. An input data stream 750 are compared to stored bytes in memory 507 as determined by read address 614. Compare and distance unit 511 computes a distance for the compare operation. Match logic 709 generates logic signals that are coupled to reload logic 710, increment logic 711 or hold logic 712. Various types of matching are possible as determined by Opcodes 602 stored with each byte of the pattern in memory 507. Depending on the Opcode 602 and the results of the compare in compare and distance unit 511, the logic in reload logic 710, increment logic 711 and hold logic 712 determine whether to hold the present read address, increment the present read address to the next value or reload the read address to its initial value to start comparing at the beginning of the pattern. Select line logic 705 is enabled by activate logic 713 via activate signal 730. Depending on the output logic states of reload logic 710, increment logic 711 and hold logic 712, one of the inputs to multiplexer (MUX) 704, hold 723, increment 722 or reload 721 will be a logic one thereby selecting input 703, 702 or 701 respectively. Increment by one 714 adds one to the present read address and generates input 702. The present read address is coupled into hold 703 and the first address in the pattern is coupled from 714. Register 614 was loaded with the first address in the pattern under control of Opcodes 602. Packet reset signal 751 resets the read address. If active signal 706 is a logic zero, then select line logic 705 is degated and all the inputs hold 703, increment 702 and reload 701 are a logic zero and MUX 704 is degated. To allow cascading of multiple PUs (e.g., PU 500 ), the signal 730, and ID 707 are coupled to the next PU. Likewise, PU 500 receives ID 752 and active signal 753 from a preceding PU. Activate logic 713 is coupled to the previous PU by signal line 790.

Figure 8:
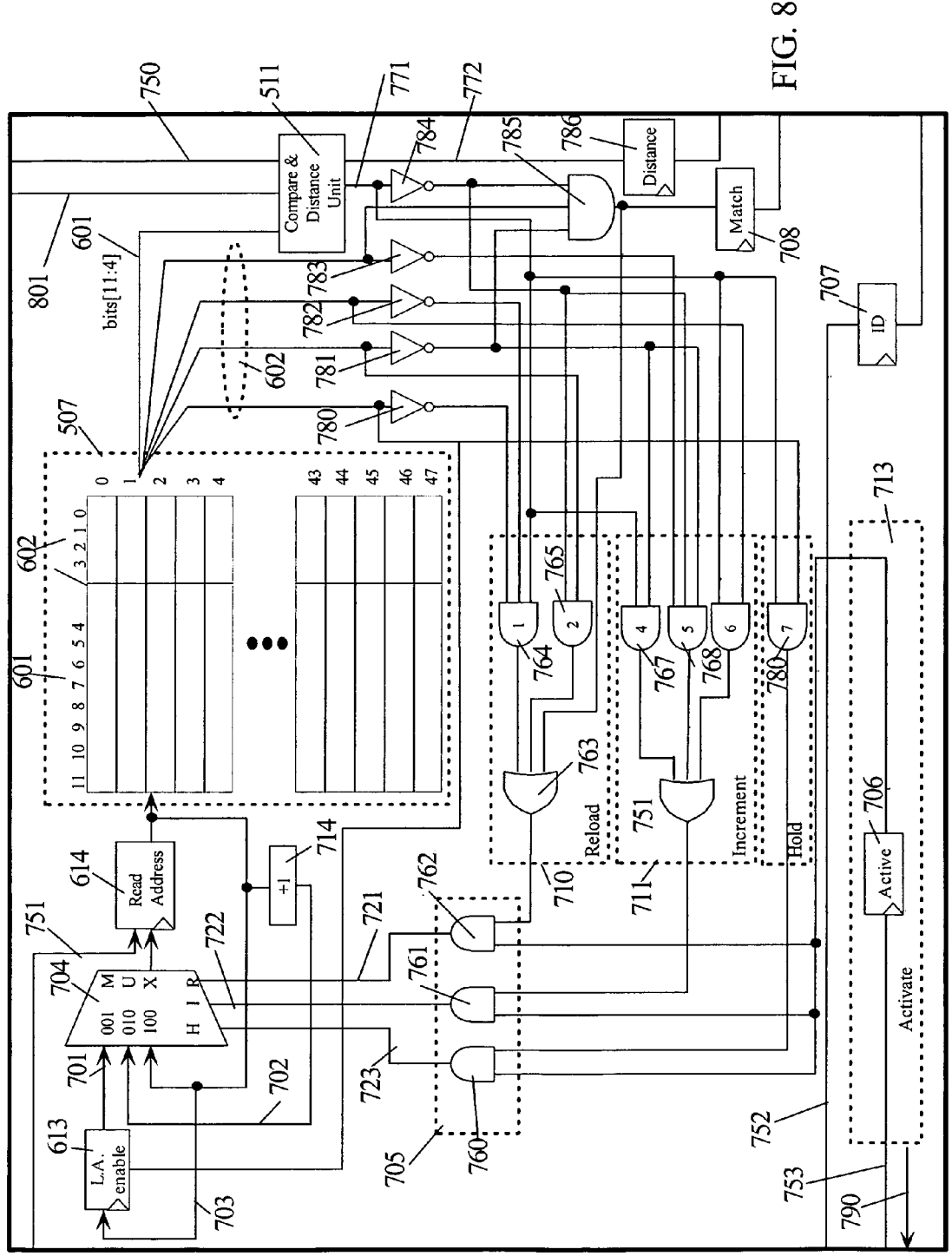
FIG. 8 is a circuit diagram of a specific implementation of a single PU.

FIG. 8 is a more detailed circuit diagram of circuitry of PU 500. FIG. 8 illustrates a more detailed circuitry for select line logic 705 (AND gates 760–762), reload logic 710 (OR gate 763 and AND gates 764–765), increment logic 711 (OR gate 766 and AND gates 767–769) and hold logic 712 (AND gate 770). Inverters 780–784 serve to generate the complement of the Opcode 602 signals.

The following description may refer between FIGS. 5, 6, 7, and 8 as these illustrate PU 500 in various degrees of detail.

The fast pattern match technology utilizes local memory (e.g., register array 507) in each PU 500 which contains a pattern 601 and flag bits (Opcodes 602) that specify options. These options may include a single wildcard, multiple wildcard, last, and inverse matching operations. A single wildcard matching means that a match is indicated if the byte having the single wildcard matching Opcode 602 set matches the current byte in an input stream. Multiple wildcard matching means that a match is indicated if an indeterminate number of bytes in sequence do not match the byte with the multiple wildcard Opcode 602. Inverse matching means that a match is indicated if every byte except the byte with the inverse Opcode 602 matches a byte in an input stream. Last Opcode 602 means that the byte is the last byte in a pattern.

Global registers include ID register 509, read address register 614, control register 505 and registers in register array 507. Additional global registers, active register 706, match register 708 and select register (not shown) may be used to designate PU 500 as active, matched, or selected for writing configuration data. The ID of a PU 500 is an ID that is unique across a chip containing multiple PUs and is used to identify what pattern has been detected in a data stream being coupled in parallel to more than one PU 500. The counter 714 is used to index through the stored pattern 601 for comparison to bytes 801 in an input data stream (from input bus 503) and the comparator (not shown) in compare unit 511 compares the pattern 601 with the input data 801 one byte at a time.

When PU 500 comes online, all registers are initialized to zero (reset). Next PU 500 receives unique ID from the input bus 503 which is stored in ID register 509. PU 500 then waits until it receives additional commands. The first command is a select command which activates PU 500 to receive further configuration commands that apply to PU 500 only. At this point the global registers may be loaded. Bytes of data are sent to the register array 507 which include the pattern data 601 and the corresponding Opcode data 602. When the configuration is complete and the active register 706 is set to "active", PU 500 waits for the packet reset signal 802 to enable the read address 614. This indicates that a new input packet is being sent to the PU 500 to begin the matching phase.

During the matching phase, one byte is sent to PU 500 at each clock cycle. PU 500 compares the byte stored (601) in the current register array position (determined by the address 614) in register array 507 with the input byte in input register 504 and checks the Opcode (602) for the byte in the current register array position of the pattern stored in 601. If there is a match or the Opcode 602 is set to a single wild card match, the pointer is incremented to select the next read address in address register 614. If the Opcode 602 for the current byte in pattern 601 is set to multiple wildcard, the pointer to address register 614 holds its current value. If a match was not found, then the pointer is reloaded. This process continues until the pointer is at the last position of a pattern and a match occurs. At this point, the match register 708 is set in PU 500. The final phase of the process is to report the found match. If the match register 708 is set, the output logic circuitry 512 sends the ID of PU 500 to the output bus 513.

FIG. 1 is a block diagram of a parallel pattern matching engine (PPDE) 100 integrated circuit (IC) architecture. PPDE 100 provides multiple mode pattern matching and has a highly flexible, massively parallel architecture. PPDE 100 can perform exact, fuzzy, longest and maximum character pattern matching. Some of the possible applications that can benefit from the capabilities of PPDE 100's high performance pattern matching are: network intrusion detection, database search image processing, lossless compression, and real-time data processing (sound, EKG, MRI, etc.). The architecture of PPDE 100 is highly flexible and scalable and may be adapted to specific applications.

PPDE 100 is an IC comprising multiple PU 500 units and other logic functions. Input/output (I/O) interface 101 couples PPDE chip 100 to system functions. I/O interface 101 couples 64 bits of input data to IC input bus 120 which in turn couples to input buffer 103. Data is written into input buffer 103 in locations determined by write address 102. Data is read from input buffer 103 using read address 108. Data is read from input buffer 103 in 8 bit bytes using multiplexer (MUX) 115 controlled by select line logic 109. Input bus 503 is coupled to each of the N PU 500 units. I/O interface 101 also couples control data to global control 107 which sends 24 bits of ID data on ID bus 501 and 4 bits of control data on control bus 502 to each PU 500 unit (PU1–PUn).

Figure 9:
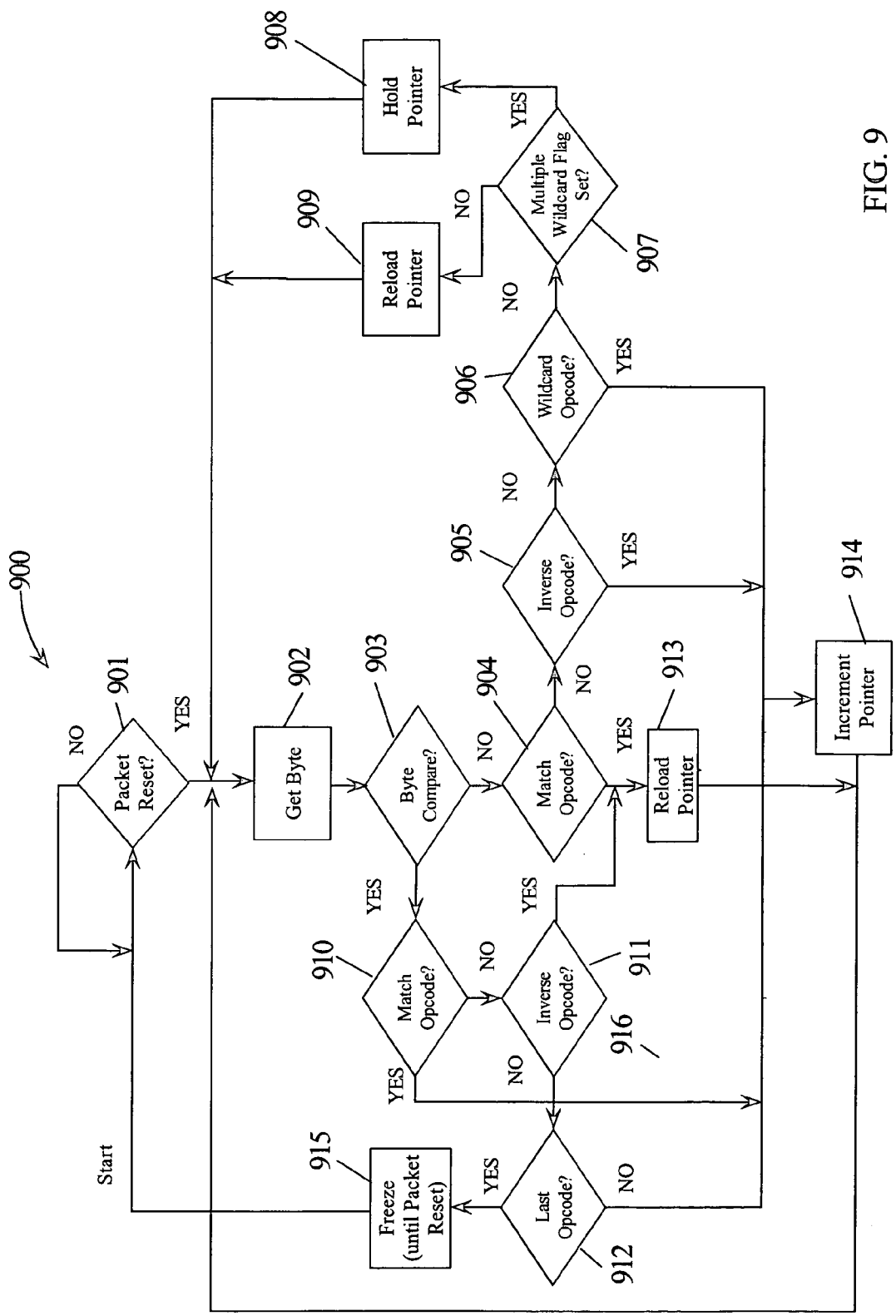
FIG. 9 is a flow diagram of method steps in embodiments of the present invention.

FIG. 9 is a flow diagram of method steps in pattern matching using a PU 500 according to embodiments of the present invention. In step 901, a packet reset is received indicating that configurations of the PU 500 is complete and a new packet (input pattern) is being sent to the PU and it should begin the matching process. In step 902 a first pattern byte of the pattern is retrieved. In step 903, the first pattern byte is compared to the first byte in the input data stream and a test is done to determine if they compare. The first pattern byte is indicated by an address pointer (pointer). If there is a compare in step 903, then a test is done in step 910 to determine if Opcode 602 is set to "match" for the present pattern byte (in this first pass it is the first pattern byte). If the Opcode 602 is set to "match", then the pointer is incremented by one to move to the next pattern byte as this is a desired result. If Opcode 602 for the present pattern byte is not set to "match", then in step 911 Opcode 602 is tested to determine if it is set to "inverse". If Opcode 602 is set to "inverse", then this is not a desired result and the pointer is reloaded back to the first pattern byte in step 913 if it is not already there. A branch is then taken back to step 902. If Opcode 602 is not set to "inverse" in step 911, then Opcode 602 is tested to determine if it is set to "last" indicating the pattern byte is the last byte in the pattern. If Opcode 602 is not set to "last" in step 912, then the pointer is incremented in step 914 and a branch is taken back to step 902. If Opcode 602 is set to "last" in step 912, then the pointer is "frozen" and a branch is taken back to step 901 awaiting a new packet reset to restart match processing.

If the pattern byte and the input data byte do not compare in step 903, then in step 904 a test is done to determine if Opcode 602 is set to "match" for the pattern byte. If Opcode 602 is set to "match" in step 904, then this is not a desired result and the pointer is reloaded back to the first pattern byte in step 913 if it is not already there. A branch is then taken back to step 902. If Opcode 602 is not set to "match" in step 904, then a test is done in step 905 to determine if Opcode 602 is set to "inverse". If Opcode 602 is set to "inverse" in step 905, then this is a desired result and the pointer is incremented in step 914 and a branch is taken back to step 902. If Opcode 602 is not set to "inverse" in step 905, then a test is done in step 906 to determine if Opcode 602 is set to "wildcard". If Opcode 602 is set to "wildcard" in step 906, then this is a desired result and the pointer is incremented in step 914 and a branch is taken back to step 902. If Opcode 602 is not set to "wildcard" in step 906, then a test is done in step 907 to determine if Opcode 602 is set to "multiple wildcard". If Opcode 602 is set to "multiple wildcard" in step 907, then the pointer is held in step 908 and a branch is taken back to step 902. If Opcode 602 is not set to "multiple wildcard" in step 907, then in step 909 the pointer is reloaded and a branch is taken back to step 902.

The operations discussed relative to FIG. 9 are called regular expression matching. These regular expressions are used within matching modes used by the PPDE incorporating multiple PU 500 units according to embodiments of the present invention.

Figure 11A:
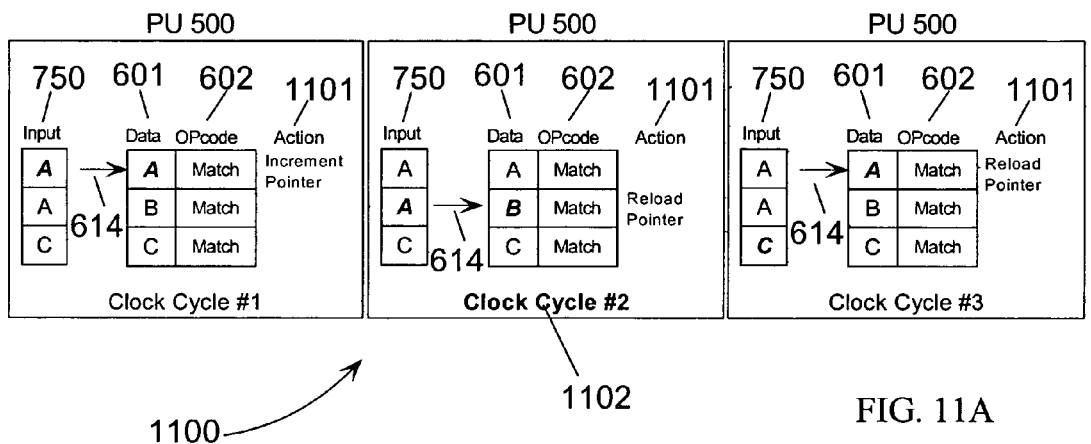
FIG. 11A–11G illustrate operation in various modes of pattern matching according to embodiments of the present invention.

FIGS. 11A–11G illustrate actions taken relative to a pattern 601 when comparing to an input data stream 750. FIG. 11A illustrates three clock cycles of the case 1100 where input data 750 is "AAC" being compared to pattern data 601 as "ABC" where each pattern byte has an Opcode 602. The actions 1101 are taken in response to the Opcodes 602. In clock cycle 1, pointer 614 starts at the byte ("A") in pattern 601. The first byte of input data 750 is also an "A". Opcode 602 for the first byte in pattern 601 is set to "match". Since the first byte of input data 750 and pattern 601 compare and Opcode 601 is set to "match", the pointer is incremented moving to the second byte in pattern 601 which is a "B". This happens in one clock cycle, therefore, in the second clock cycle (labeled 1102 because it is significant to the particular pattern in FIG. 11A), the second byte in input pattern 750 ("A") is compared to the second byte in pattern 601 ("B"). The Opcode 602 for the second byte of pattern 602 is set to "match". Since these two bytes do not compare, the sequence "AB" in pattern 601 cannot match the first two bytes "AA" of input data 750 as required by the Opcode 602. Therefore, in clock cycle 2 (1102), pointer 614 is reloaded with the address of the first byte in pattern 602 and comparison begins again. In clock cycle 3, the third byte in input data 750 is compared to the first "A" in pattern 602.

Figure 11B:
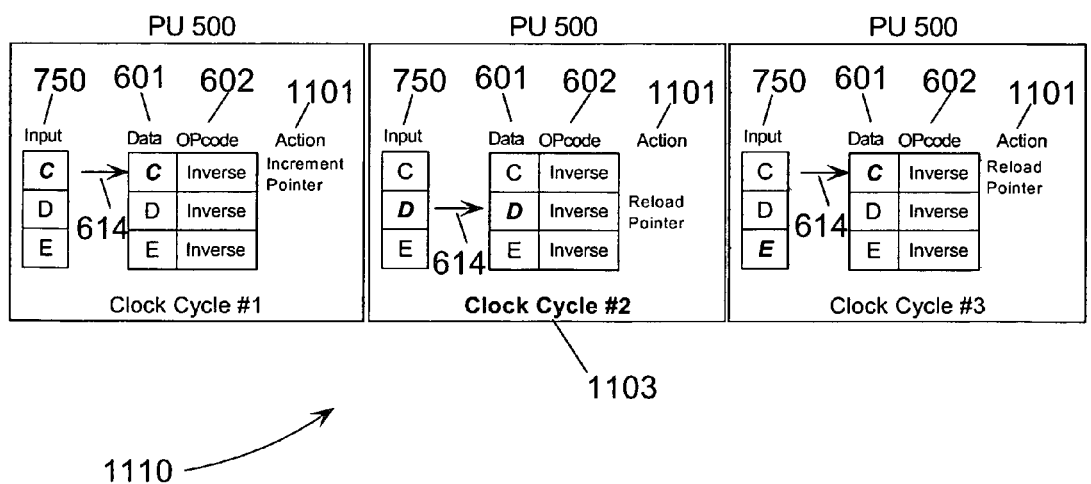

FIG. 11B illustrates the case 1110 where the bytes sequence of input data stream 750 as "CDE" does match pattern 602 as a "CDE" but an Opcode 602 on one of the pattern bytes is set to "inverse" indicating that a match between a byte in input data 750 and a byte in pattern 601 is not desired. In clock cycle 1, the first "C" in input data 750 matches the "C" in pattern 601 and the Opcode 602 is set to "match". Since this is a desired result the pointer 614 is incremented and the second byte ("D") of input data 750 is compared to the second byte ("D") of pattern 601 and these bytes do compare. However, the Opcode 602 is set to "inverse" and a match is not desired, therefore in clock cycle 2 (1103) the pointer 614 is reloaded and the first byte of pattern 601 is again selected. In clock cycle 3, the third byte "E" in input data 750 is compared to the first byte "C" of pattern 601. The example of FIG. 11B is "looking" for an input sequence "C!DE" where the "!D" indicates any character but not "D" is acceptable.

Figure 11C:
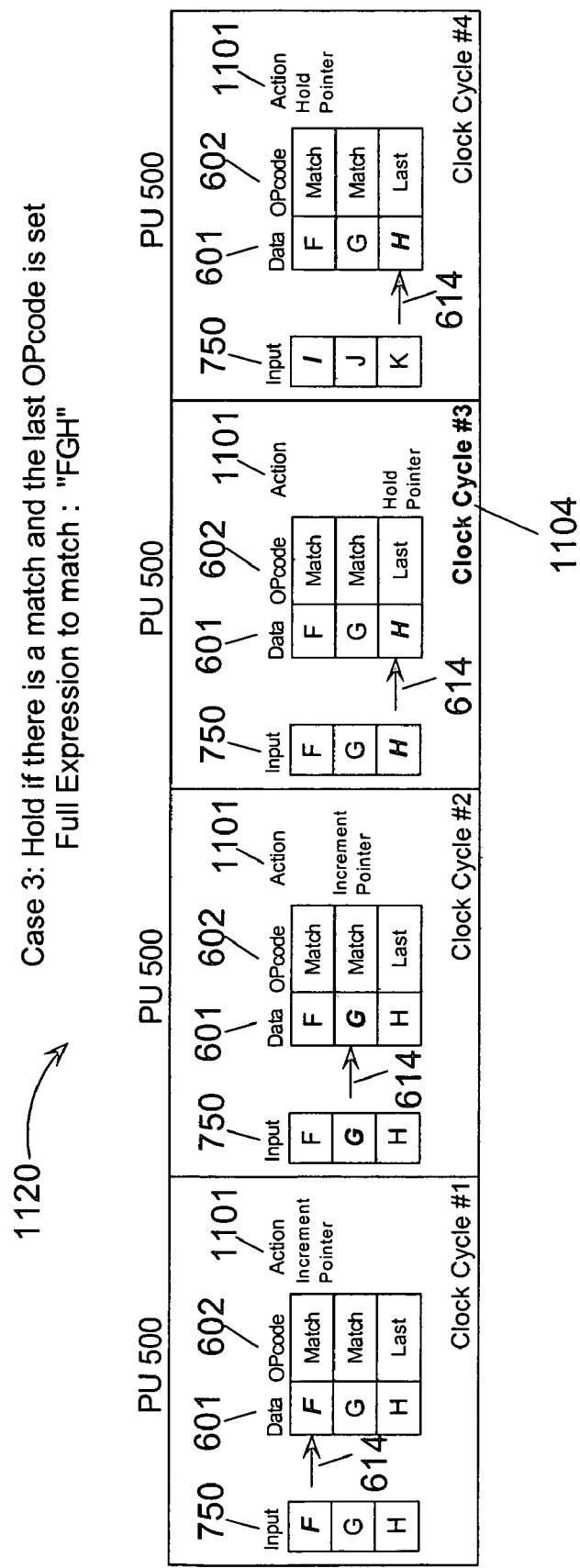

FIG. 11C illustrates case 1120 where a complete pattern 601 is shown with an Opcode 602 set to "last". In clock cycle 1, the first byte "F" in input data 750 matches with the first byte "F" in pattern 601 and Opcode 602 is set to "match". Since this is a correct result, pointer 614 is incremented. In clock cycle 2, the second byte "G" in input data 750 matches with the second byte "G" in pattern 601 and Opcode 602 is set to "match". Again, pointer 614 is incremented as this is a correct result. In clock cycle 3 (1104), the third byte "H" in input data 750 matches the third byte "H" in pattern 601. In this case, Opcode 602 is set to "last" indicating that the third byte is the last byte in a complete pattern 601 (in this case "FGH"). In this case the pattern "FGH" is detected in input data 750 and a match signal can be assert. Since there is additional input data 750, pointer 614 is reloaded back to the first byte in pattern 601 and the matching process continues "looking" for additional occurrences of the complete pattern "FGH" in succeeding bytes of input data 750.

Figure 11D:
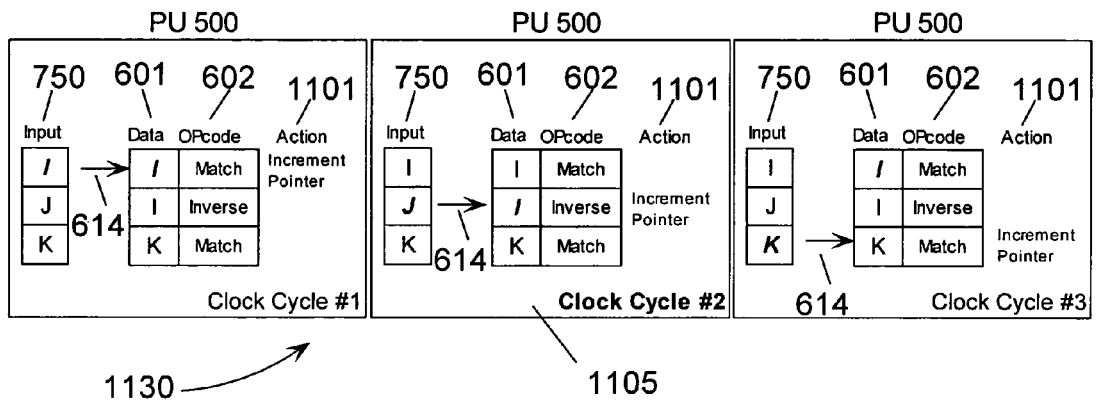

FIG. 11D illustrates case 1140 where a pattern 601 byte has Opcode 602 set to "inverse" and the bytes do not compare. In clock cycle 1, the first byte "I" in input data 750 matches the first byte "I" in pattern 601 and the Opcode 602 is set to "match". Since this is a desired result, the pointer 614 is incremented and the second byte ("J") of input data 750 is compared to the second byte ("I") of pattern 601 and these bytes do not compare. However, the Opcode 602 is set to "inverse" and no match is a desired result; therefore, in clock cycle 2 (1105), the pointer 614 is incremented and the third byte "K" of pattern 601 is again selected. In clock cycle 3, the third byte "K" in input data 750 is compared to the third byte "K" of pattern 601. Again, a match is detected and the pointer 614 is incremented. The example of FIG. 11D is "looking" for an input sequence "I!JK" where the "!J" indicates any character but "J" is acceptable.

Figure 11E:
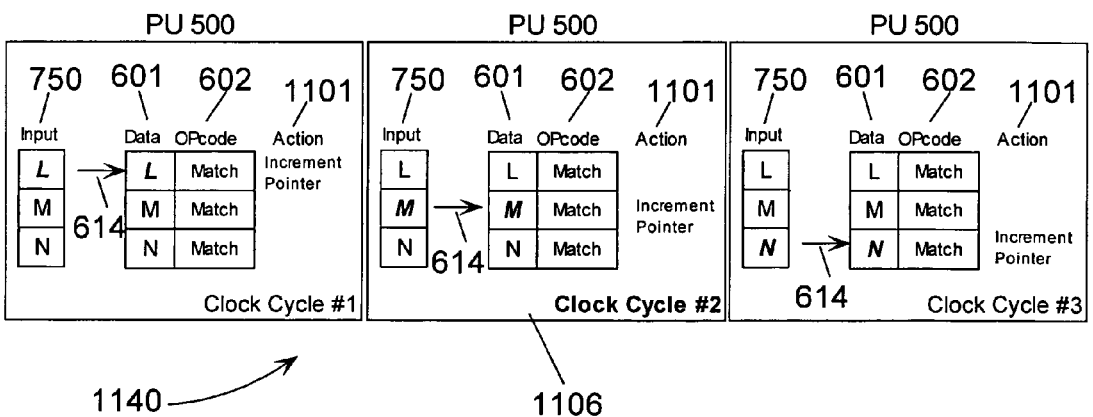

FIG. 11E illustrates case 1130 where pattern 601 matches a sequence in input data 750 and the Opcodes 602 are set to "match". In clock cycle 1, pointer 614 starts at the byte ("L") in pattern 601. The first byte of input data 750 is also an "L". Opcode 602 for the first byte in pattern 601 is set to "match". Since the first byte of input data 750 and pattern 601 compare and Opcode 601 is set to "match", the pointer 614 is incremented to the second byte in pattern 601 which is an "M". In the second clock cycle, the second byte in input pattern 750 ("M") is compared to the second byte in pattern 601 ("M"). The Opcode 602 for the second byte "M" of pattern 602 is set to "match". Since these two bytes compare, the pointer 614 is again incremented. In clock cycle 3, the third byte "N" in input data 750 is compared to the third byte "M" in pattern 602. Since they compare, the pointer is again incremented. FIG. 11E illustrates a partial match of "LMN" in pattern 601 to the sequence "LMN" in input data 750.

Figure 11F:
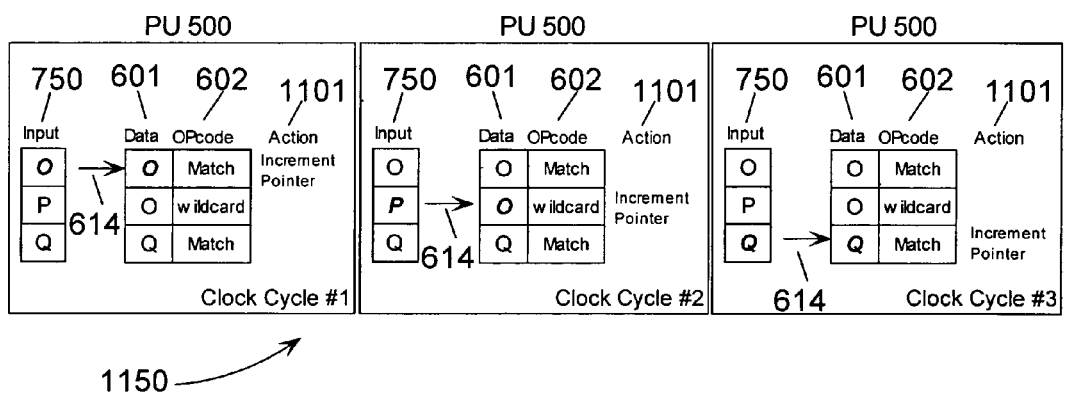

FIG. 11F illustrates case 1150 where there is NOT a pattern match and the wildcard Opcode is set for a byte in the pattern 601. In clock cycle 1, the "O" in input data 750 matches with the "O" in pattern 601. Since the Opcode 602 is set to "match", the pointer 614 is incremented. In clock cycle 2, second byte "O" of pattern 601 does not match the "P" in the second byte of input data 750. However, since Opcode 602 is set to "wildcard" any character is accepted and pointer 614 is again incremented. In clock cycle 3, the third byte "Q" of pattern 601 matches the third byte "Q" in input 750 and pointer 614 is incremented. In this case, the sequence "O•Q" is found where "•" indicates any character.

Figure 11G:
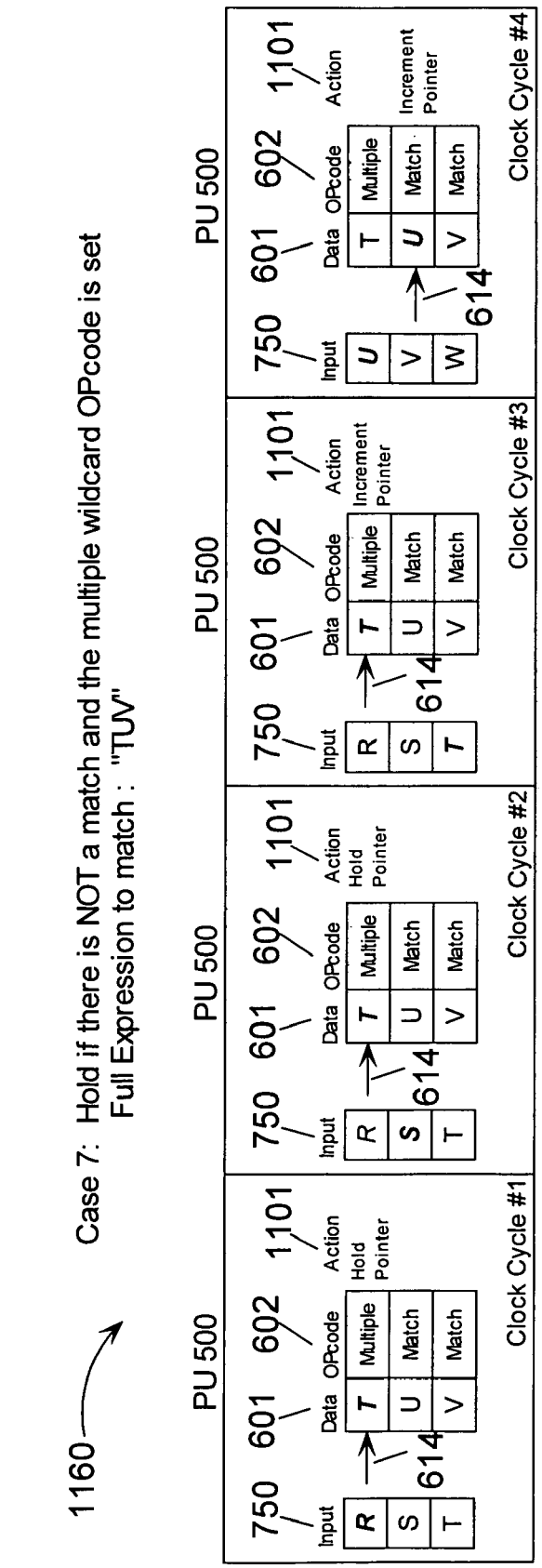

FIG. 11G illustrates case 1160 where there is not a pattern match and a byte of pattern 601 has the Opcode 602 set to "multiple wildcard" (shown as simply "multiple"). In clock cycle 1, the first byte "T" in pattern 601 does not match the first byte "R" in input data 750. However, since Opcode 602 is set to "multiple", the pointer 614 is held at its present position (in this case, first byte of pattern 601). In clock cycle 2, the first byte "T" of pattern 601 does not compare with the second byte in input data 750. Since Opcode 602 remains set to "multiple", the pointer 614 is held at the first byte of pattern 601. In clock cycle 3, the first byte "T" of pattern 601 does compare with the third byte of input data 750 and pointer 614 is incremented to the second byte of pattern 601. In clock cycle 4, the second byte of pattern 601 does compare with the fourth byte of input data 750 and the pointer 614 is again incremented. In clock cycle 5 (not shown), the third byte of pattern 601 matches the fifth byte in input data 750 and the pattern "TUV" is detected in input data 750.

The PPDE 100 has four matching modes: exact, longest, maximum and fuzzy. Exact matching may be used for aligned or non-aligned data and may incorporate the regular expressions such as single wildcard, multiple wildcard, inverse, or inclusive set. The exact matching mode may be utilized in applications such as network intrusion where line speed matching is critical and a binary match or not match response is only needed.

In the longest match mode, each PU 500 unit keeps track of the number of consecutive bytes matched and does not reset until the end of a pattern packet. In the longest match mode, each PU 500 outputs the number of matched bytes along with its ID to the ID selection unit 114 (FIG. 1A). ID selection unit 114 then outputs the ID of the PU 500 with the maximum number of matched bytes along with the length value of the longest match to the output buffer 105.

In the maximum matching mode, each PU 500 keeps track of the number of bytes matched and does not reset until the end of a pattern packet. In this mode, each PU 500 outputs the number of matched characters along with its ID to the ID selection unit 114. The ID selection unit 114 then outputs the ID of the PU 500 with the maximum number of matches and the value of the maximum number to the output buffer 105.

In the fuzzy matching mode, each PU 500 "looks" for the closed pattern and then outputs the ID of the PU 500 with the closest match and a corresponding distance value quantifying the closeness of the match to ID selection unit 114 which in turn outputs the results to the output buffer 105. The distance is the result of a comparison between the input Pattern and the Reference pattern (RP) previously stored in memory. The distance calculation method is based on a norm that is user selectable. Several norm can be used, the norm can uses the "absolute value of a difference" operator. The successive elementary distances can be summed in the case of the Manhattan distance, i.e. dist=sum (abs (IEi−REi)) or the maximum value thereof is selected in the case of the maximum norm to determine the final distance. i.e. dist=max (abs (IEi−REi)) where IEi (Input Element) and REi (Reference Element) are the components of rank i (variable i varies from 1 to k) for the input pattern IP and the stored prototype Reference pattern RP respectively. Note that "abs" is an usual abbreviation for "absolute value". Other norms exist, for instance the L2 norm such as dist=square root (sum (IEi−REi)$^2$. The L2 norm is said to be "Euclidean" while the Manhattan and maximum norms are examples of "non-Euclidean" norms. Other Euclidean or non-Euclidean norms (such as the match/no match) are known for those skilled in the art. In particular, the "match/no match" norm, represented by the "match (IEi, REi)" operator is extensively used. The closest match is the pattern with the lowest result. Fuzzy matching is useful in image processing and real time data processing where the input data stream may have white noise superimposed on data.

Figure 2A:
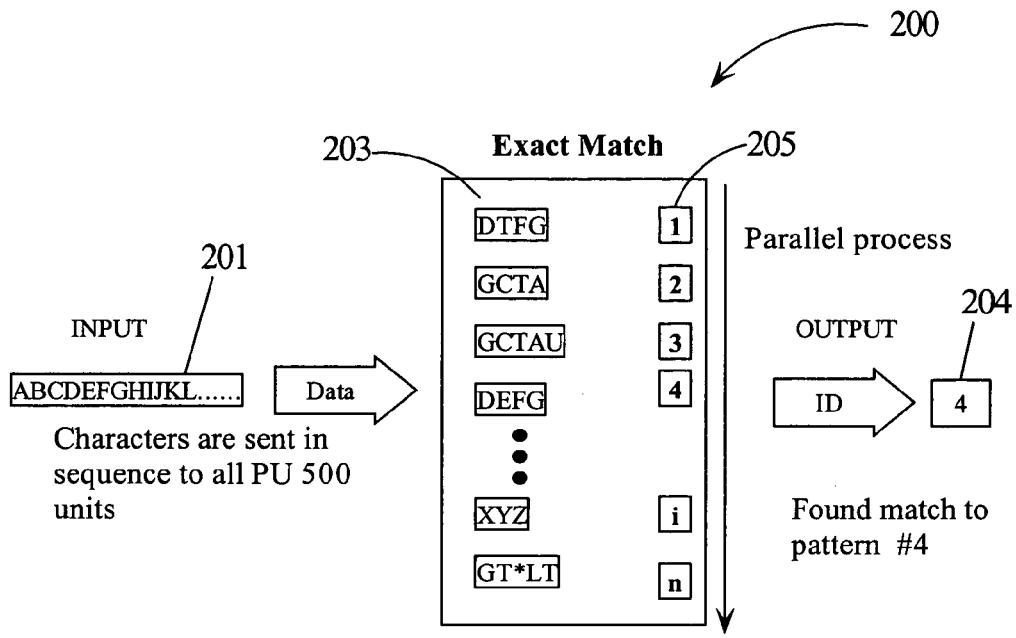
FIG. 2A–2D are block diagrams of four matching modes which may be programmed for each of the N processing units (PUs) of FIG. 1.

FIG. 2A illustrates an example of the exact matching mode 200 using a PPDE 100 according to embodiments of the present invention. Patterns 203 correspond to ID numbers 205 numbered 1–n and identify n PU 500 units incorporated into a PPDE 100. Input pattern 201 would be sent in parallel to each of the n PU 500 units. In this mode, PPDE 100 is programmed to find if any of the n patterns are found in input data stream 201. By inspection, one can see that only pattern "4" is found in its exact sequence in the portion of input data stream 201 shown. In this case, the ID of the PU 500 with the exact match (in this case, "4" is the ID) would be outputted (output 204) to ID selection unit 114 (not shown) which would send the value to output buffer 105 (not shown).

Figure 2B:
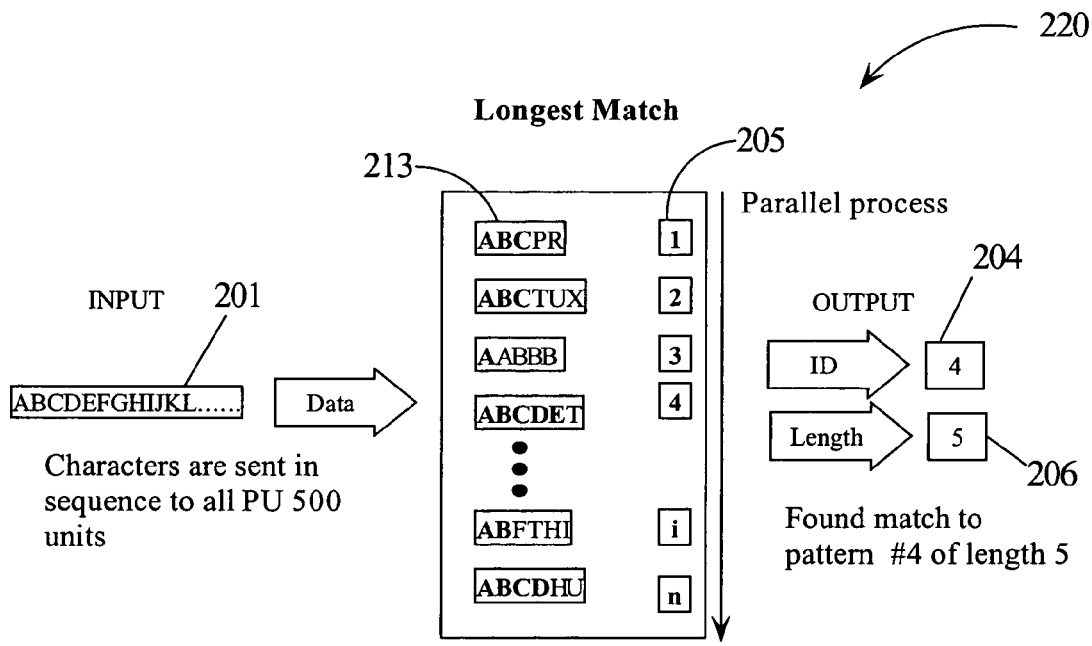

FIG. 2B illustrates an example of the longest match mode 220 using a PPDE 100 according to embodiments of the present invention. Again, input data stream 201 is coupled in parallel to n PU 500 units with ID numbers 205 numbered 1–n. In this mode, PPDE 100 is programmed to determine the most consecutive bytes in the patterns 213 that appear in input data stream 201. Again, by inspection one can see that pattern "4" has the longest match with 5 consecutive bytes "ABCDE" appearing in the input data stream 201. In this case, the ID of the PU 500 with the longest match (in this case, "4" is the ID) would be outputted (output 204) along with the longest match value of "5" (output 206) to ID selection unit 114 (not shown) which would send the value to output buffer 105 (not shown).

Figure 2C:
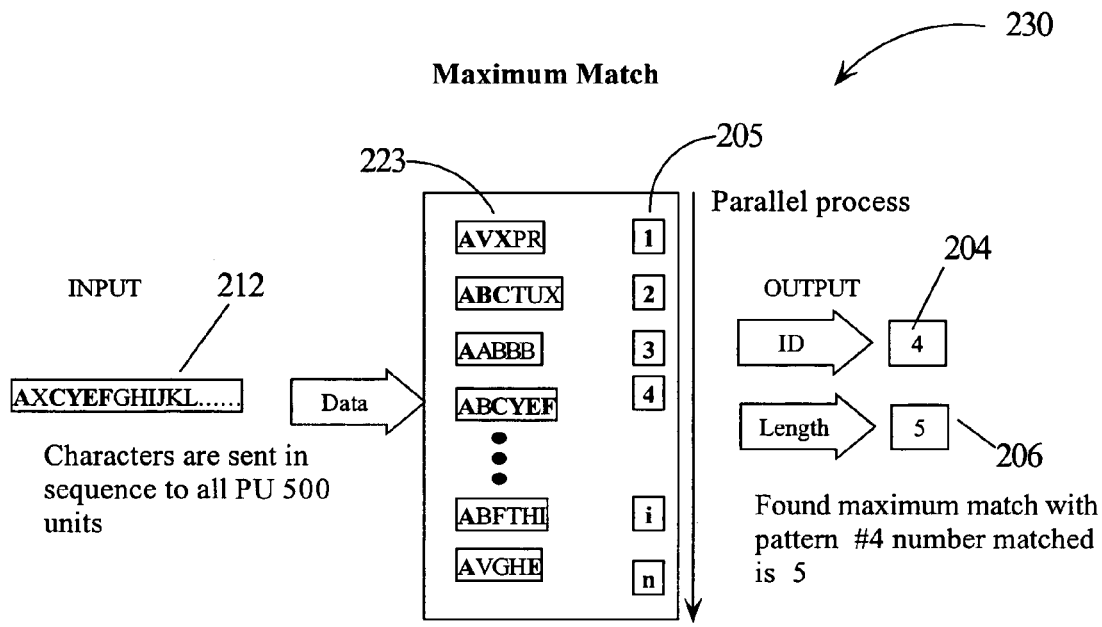

FIG. 2C illustrates an example of the maximum match mode 230 using a PPDE 100 according to embodiments of the present invention. Again input data stream 212 is coupled in parallel to n PU 500 units with ID numbers 205 numbered 1–n. In this mode PPDE 100 is programmed to determine the maximum number of bytes in the patterns 223 that appear in input data stream 212 not necessarily in consecutive order. Again, by inspection one can see that pattern "4" has the maximum number with 5 matching bytes "ACYEF" appearing in the input data stream 212. In this case, the ID of the PU 500 with the maximum number of matches (in this case, "4" is the ID) (output 204) along with the maximum number value of "5" (output 206) are outputted to ID selection unit 114 (not shown) which would send the value to output buffer 105 (not shown).

Figure 2D:
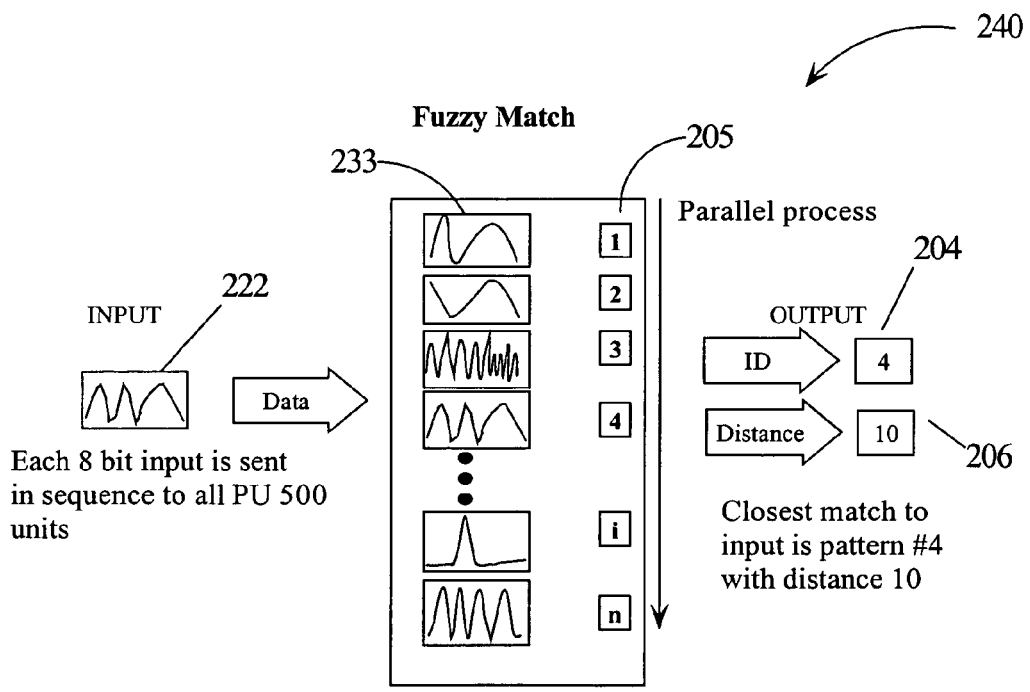

FIG. 2D illustrates an example of the fuzzy match mode 240 using a PPDE 100 according to embodiments of the present invention. Input data stream 222 is coupled in parallel to n PU 500 units with ID numbers 205 numbered 1–n. In this example, input data stream 222 is an analog signal which would be digitized and each 8 bit input value would be sent to the n PU 500 units in parallel. In this mode, PPDE 100 is programmed to determine which of the patterns 233 most closely matches input data stream 222. Again by inspection one can see that pattern "4" has the closest match. In actual operation, distance circuitry 611 (not shown) would be used to make this determination. In this case, the ID of the PU 500 with the closest match (in this case "4" is the ID) (output 204) along with the distance value of "10" (output 206) would be outputted to ID selection unit 114 (not shown) which would send the value to output buffer 105 (not shown).

Figure 3:
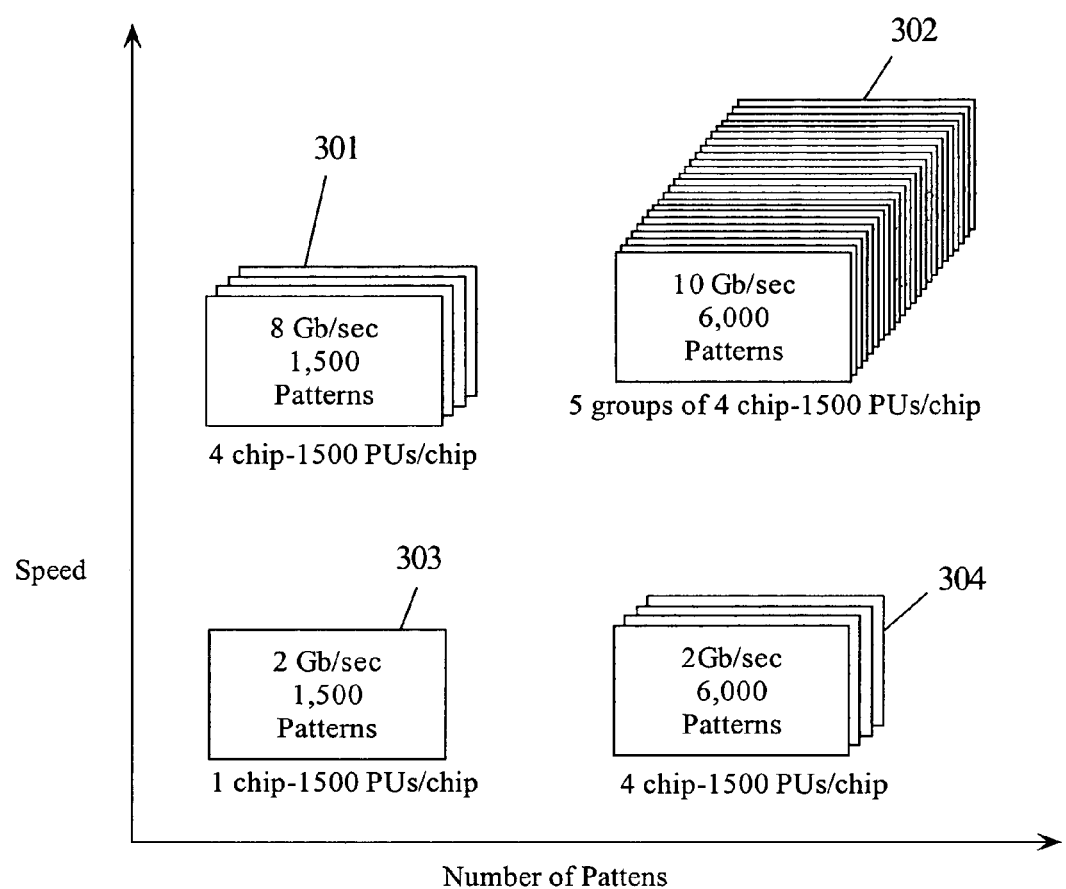
FIG. 3 is a chart illustrating the various modes of scalability of the PPDE of the present invention.

FIG. 3 is a block diagram illustrating the scalability of PPDE 100. The architecture of PPDE 100 allows for multiple chips to be cascaded. This feature may be used to either increase the number of processing units or to increase the performance by splitting the input data amongst the several chips. FIG. 3 illustrates the direct correlation between the number of chips and the number of PU 500 units. Block 303 shows the standard performance of one PPDE 100 chip. As PPDE 100 chips are added (by cascading) along the X axis the performance increases. Also, as the number of PU 500 units per PPDE 100 chip are added along the Y axis, the performance increases. Block 301 illustrates that by adding 4 chips (1500 PU 500 units) processing is increased to 8 Gb/sec for 1500 patterns. Block 304 illustrates using 4 chips to increase the number of patterns while maintaining the processing speed of 2 Gb/sec. Block 302 illustrates adding 5 groups of 4 chips coupled to process 6000 patterns to allow a system that can process 6000 patterns at 10 Gb/sec.

FIG. 4 illustrates a performance table of a PPDE 100 chip. Using a 0.13 micron CMOS technology, a PPDE 100 with 1500 PU 500 units would result in an 8 millimeter (mm) by 8 mm chip dimension. This corresponding PPDE 100 would achieve a bandwidth of 2 Gbits/sec with a 250 MHz clock frequency wherein an 8 bit byte is processed each clock cycle. At this speed the PPDE 100 chip would dissipate about 300 milliwatts (mw) of power and would compute at 1.25 tera operations per second. The PPDE 100 has the capability to be set in a standby mode in which it would consume a minimal amount of power. A PPDE 100 may be used with any I/O interface 101. Using a Peripheral Component Interconnect (PCI) protocol a maximum of 4 Gb/sec may be received at I/O 101. The PCI connection would have 88 I/O signals. 64 of which would be incoming data with 24 reserved for control.

Figure 12:
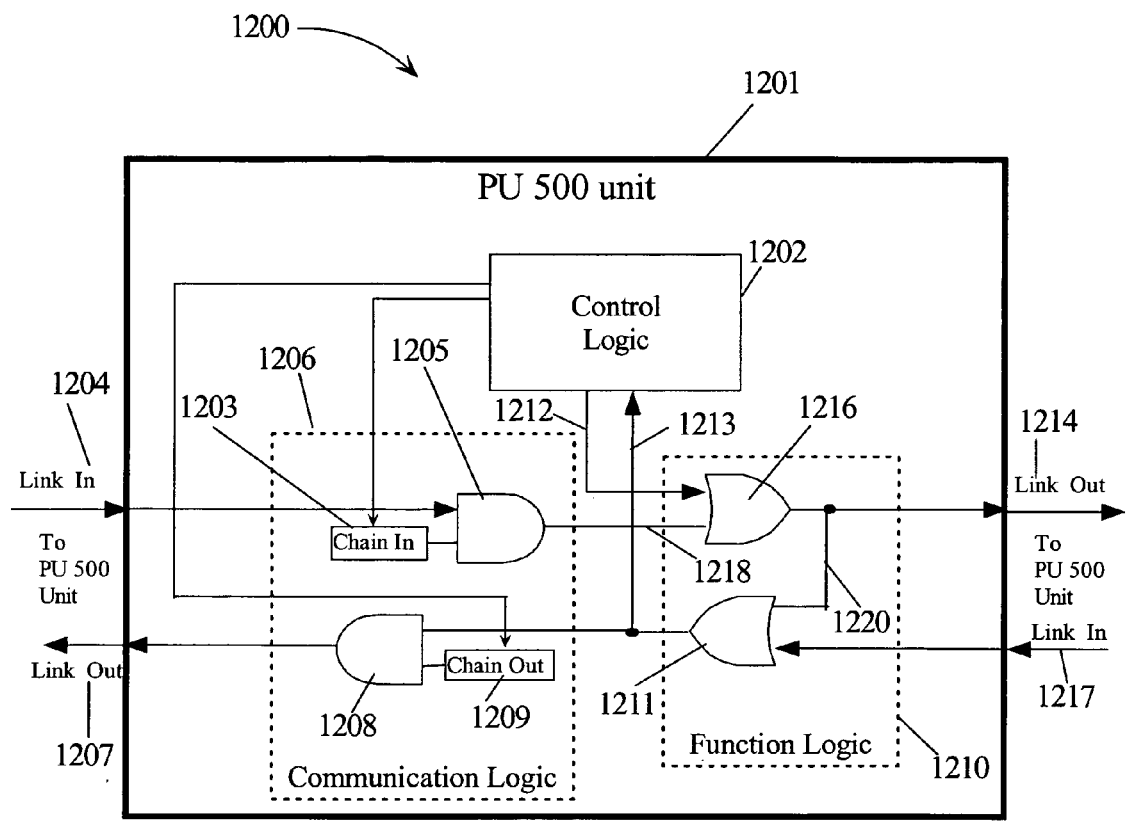
FIG. 12 is a circuit block diagram of cascading circuitry used for communication between multiple PU 500 units within a PPDE 100 according to embodiments of the present invention.

FIG. 12 is a circuit diagram of bi-directional bus circuitry 1201 used for bus communication between multiple PU 500 units within a PPDE 100 according to embodiments of the present invention. Control logic 1202 receives data on input 1213 and sends data on output 1212 to enable bi-directional communication for PU 1200. Cascade circuitry 1201 has communication logic 1206 and function logic 1210 coupled to control logic 1202. Link In 1204 receives data outputted from a preceding PU 500 (not shown) and Link Out 1214 outputs data from control logic 1202 to a following PU 500 (not shown) If communication between PU 1200 and a preceding PU 500 (not shown) is enabled, then a logic one is written to Chain In register 1203 and Chain Out register 1209 which in turn enables AND logic gates 1205 and 1208 respectively. Data from Link In 1204 is coupled through AND gate 1205 to the input of OR logic gate 1216 an then to Link Out 1214. Link Out 1214 couples either data from Link In 1204 or data from output 1212 of control logic 1202. If communication with the preceding PU 500 (not shown) is not desired, then Chain In register 1203 and Chain Out register 1209 are loaded with a logic zero which disables AND gates 1205 and 1208 respectively. Data from a preceding PU 500 is coupled to control logic 1202 via AND gate 1205 (Chain In is a logic one) to output 1218. OR gate 1216 couples the data to line 1220 which is the input of OR gate 1211. The output of OR gate 1211 then couples the data via input 1213 to control logic 1202. Likewise, data from a following PU 500 (not shown) sends data via Link In 1217 to the input of OR gate 1211. Again, the output of OR gate 1211 couples the data to input 1213 of control logic 1202. If Chain Out 1209 is loaded with a logic one, data from a following PU 500 is coupled via AND gate 1208 to Link Out 1207 which is coupled as the Link In signal (e.g., Link In input) to the preceding PU 500.

The bi-directional bus circuitry 1201 allows fewer units to achieve advanced matching capabilities by cascading together multiple PU 500 units using the cascade circuitry 1201. Control logic 1202 may employ a multiplexer (not shown) to determine what data it sends on line 1212. Likewise, control logic 1202 may employ another multiplexer (not shown) to determine to what circuitry in control logic 1202 data received on input 1213 is routed. The communication logic 1206 may be programmed to either merge or isolate incoming and outgoing data signals. For example, incoming data on Link In 1204 may be blocked or passed by AND gate 1205 depending on the state of Chain In register bit 1203. Likewise, incoming data on Link In 1217 or from line 1220 may be blocked or passed by AND gate 1208 depending on the state of Chain Out register bit 1209. Selective isolation is accomplished by setting either Chain In register bit 1203 and/or Chain Out register bit 1209 to logic zero. Merging is accomplished by setting Chain In register bit 1203 and Chain Out register bit 1209 to logic one. Merging allows the bi-directional bus circuitry 1201 to be used by multiple adjacent PU 500 units to communicate as a group.

Figure 13:
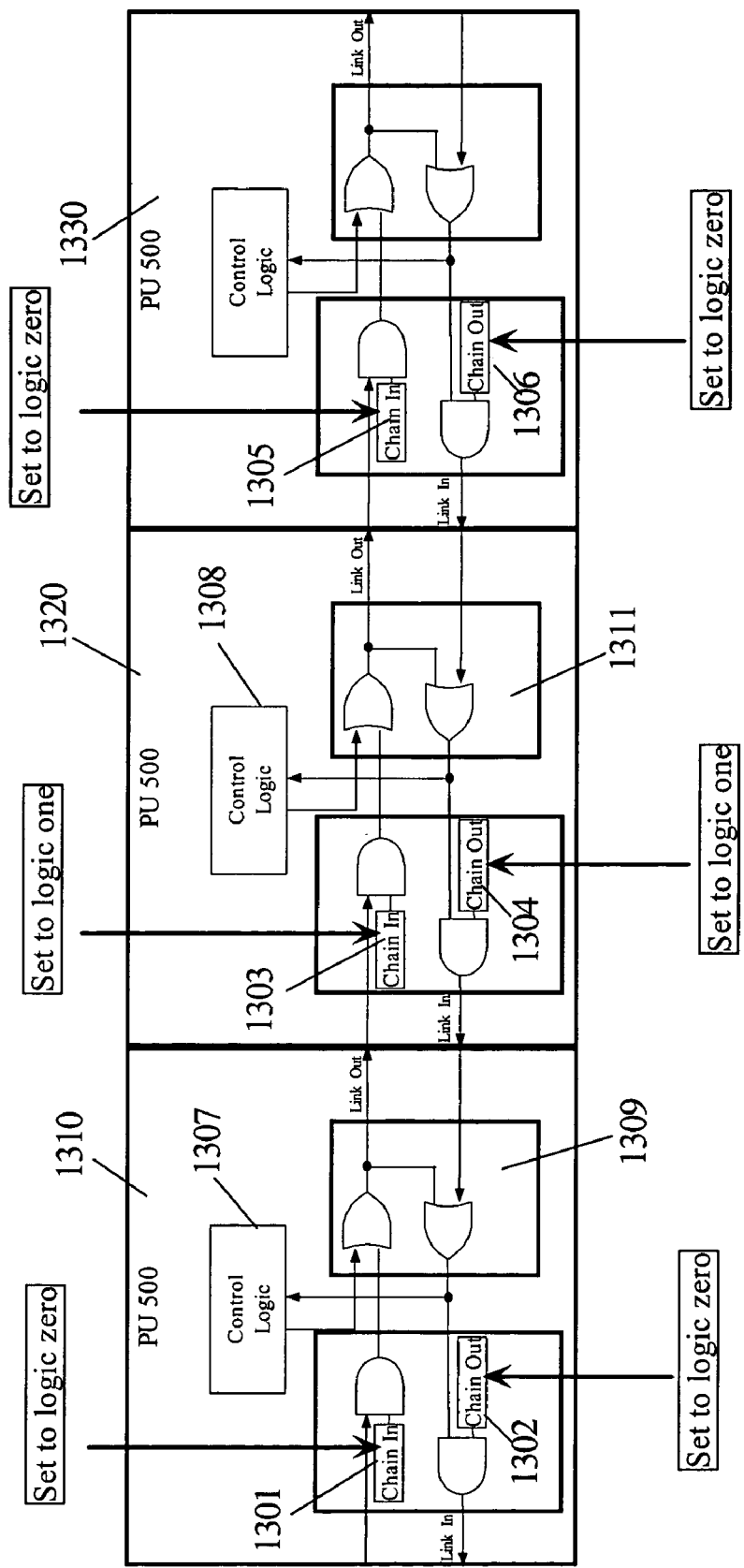
FIG. 13 is another block diagram of the communication circuitry between a PU 500 and two adjacent PU 500 units according to embodiments of the present invention.

FIG. 13 is a block diagram of communication between a PU 500 and two adjacent PU 500 units illustrating further cascade bi-directional communication and isolation. The details of the cascade communication circuit in PU 500 1310–1330 is shown and described relative to FIG. 12. FIG. 13 illustrates bi-directional communication between PU 500 units 1310 and 1320. Although PU 500 unit 1330 is physically connected to PU 500 unit 1320, PU 500 unit 1320 does not receive or send data to PU 500 unit 1330 with the logic states of the Chain In and Chain Out registers bits as shown. Chain In register 1301 is set to a logic zero and Chain Out register 1302 is set to a logic zero. This isolates PU 500 unit 1310 from any PU 500 unit (not shown) that is physically coupled to the left. Chain In register 1303 and Chain Out register 1304 are set to a logic one which enables bi-directional communication between PU 500 unit 1310 and PU 500 unit 1320. Again, Chain In register 1305 and Chain Out register 1306 are set to logic zero which isolates PU 500 unit 1320 from any PU 500 1330 and any other PU 500 unit (not shown) coupled to the right of PU 500 unit 1330.

Control logic 1307 and 1308 in PU 500 units 1310 and 1330 respectively may be programmed to send and receive an increment pointer signal when a match occurs. This allows a PPDE 100 employing PU 500 units with cascade circuitry 1201 to use less units to match regular expressions. For example, one may examine what is required to match the logic pattern "A·B·[C+D]·[F+G]·[I+J]". This reads A (and) B (and) [C or D] (and) [F or G] (and) [I or J]. If this logic pattern is expanded, one would need to examine an input data stream to determine if any of the following patterns occurred: ABCFI, ABCFJ, ABCGI, ABCGJ, ABDFI, ABDFJ, ABDGI, and ABDGJ. If these patterns were loaded into individual PU 500 units it would take 8 PU 500 units to do this pattern matching in parallel. However, if two adjacent PU 500 units 1310 and 1330 are loaded with the patterns ABCFI and ABDGJ with their respective increment pointer signals merged by the function logic 1309 and 1311 respectively, then only two units are required. Normally the pointer of a particular PU 500 unit would not be incremented unless a match occurred within its particular pattern. In the preceding case, if either PU 500 unit 1310 and 1330 registers a match, then the increment pointer signal from either PU 500 unit 1310 or 1330 is used to increment the pointer of the other. The chip space on an IC implementing a PPDE 100 using PU 500 units with cascade circuitry 1201 saves considerable space as cascade circuitry 1201 requires only two wires and a few logic gates to implement. The cascade circuitry 1201 enables a large savings in required PU 500 units for many applications.

Figure 10:
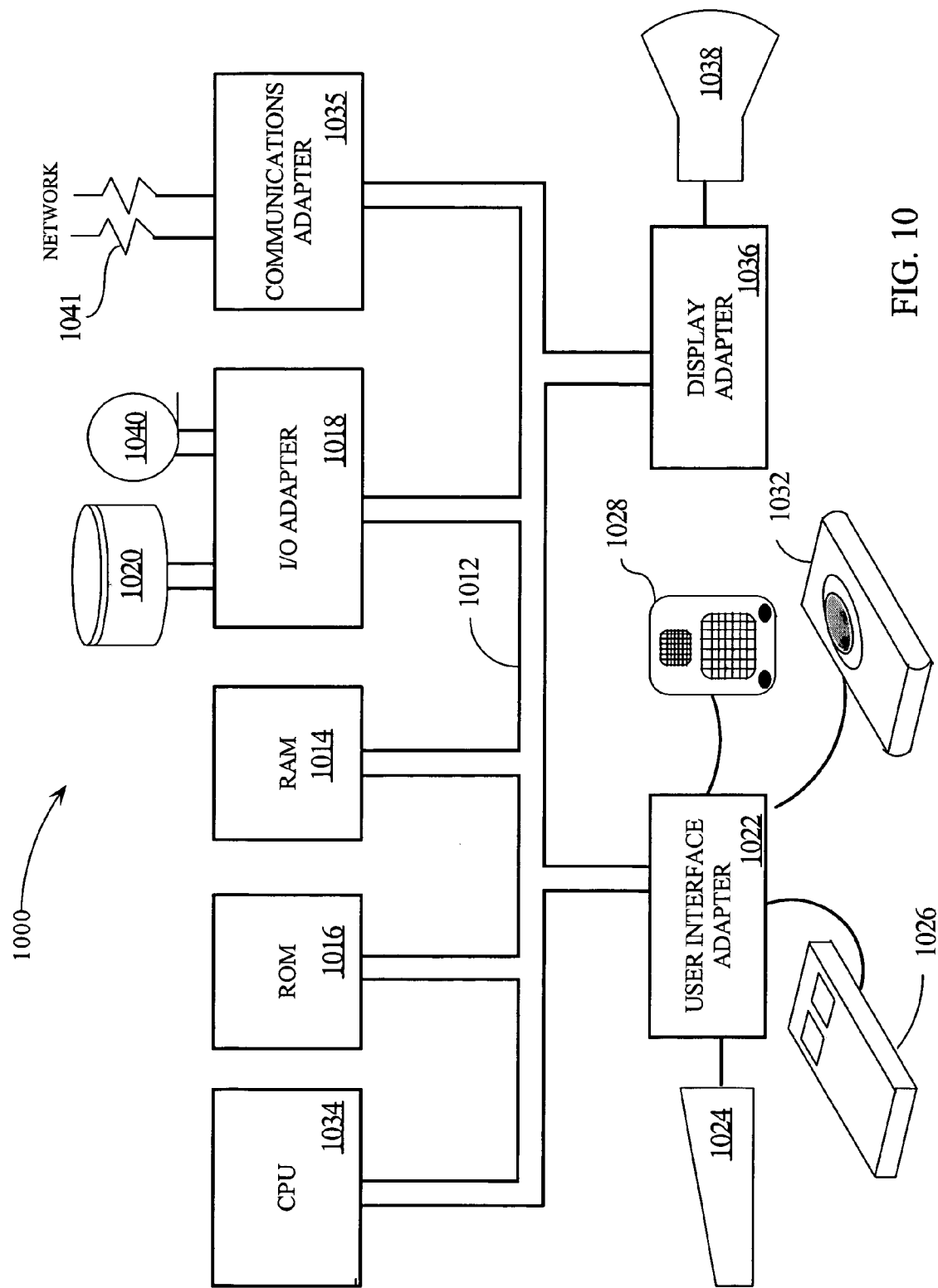
FIG. 10 is a data processing system suitable for practicing embodiments of the present invention.

A representative hardware environment for practicing the present invention is depicted in FIG. 10, which illustrates a typical hardware configuration of a workstation in accordance with the subject invention having central processing unit (CPU) 1034 with one PPDE or a plurality of PPDEs 100 chips and other units interconnected via system bus 1012. The workstation shown in FIG. 10 includes random access memory (RAM) 1014, read only memory (ROM) 1016, and input/output (I/O) adapter 1018 for connecting peripheral devices such as disk units 1020 and tape drives 1040 to bus 1012, user interface adapter 1022 for connecting keyboard 1024, mouse 1026, speaker 1028, microphone 1032, and/or other user interface devices such as a touch screen device (not shown) to bus 1012, communication adapter 1035 for connecting the workstation to a data processing network, and display adapter 1036 for connecting bus 1012 to display device 1038. Input data 120 (input data stream, pattern data, and various control data) may be provided to the PPDE 100 chips in CPU 1034 from various sources including network 1041, disk unit 1020, tape drives 1040 or form various input devices such as microphone 1032, keyboard 1024, etc. Other input devices, such as fingerprint readers and voice recognition units, may provide input data streams that are matched against stored patterns using one or more PPDE 100 chips according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method for providing a bi-directional communication bus between a first processing unit (PU) and a second and third PU each adjacent to the first PU and within M processing units (PUs), wherein the first PU is physically coupled to the second PU with a first Link input and a first Link output and to the third PU with a second Link input and a second Link output, the method comprising the steps of:

sending a first output signal from an output of the first PU to the third PU on the second Link output or selectively sending a second output signal received on the first Link input from the second PU to the third PU on the second Link output in response to the first logic state of a first enable signal;

selectively sending a third output signal received on the second Link input from the third PU or the first output signal from the first PU to the second PU on the first Link output in response to the first logic state of a second enable signal; and receiving, in an input of the first PU, the third output signal received on the second Link input from the third PU or selectively receiving the second output signal on the first Link input from the second PU when the first enable signal has the first logic state.

2. The method of claim 1, wherein the first and second enable signals are generated by control logic in the first PU.

3. The method of claim 1, wherein communication between the second PU and the first and third PU is blocked when the first and second enable signals concurrently are at a second logic state.

4. The method of claim 1, wherein the second PU has a second Link output coupled to the first Link input of the first PU and a second Link input coupled to the first Link output of the first PU.

5. The method of claim 1, wherein the third PU has a first Link input coupled to the second Link output of the first PU and a first Link output coupled to the second Link input of the first PU.

6. A bi-directional communication bus in each of M processing units (PUs) for bi-directional communication between a first processing unit (PU) and a second and third PU each adjacent to the first PU and within the M PUs, wherein the first PU is physically coupled to the second PU with a first Link input and a first Link output and to the third PU with a second Link input and a second Link output comprising:

circuitry for coupling a first output signal from an output of the first PU to the third PU on the second Link output or selectively coupling a second output signal received on the first Link input from the second PU to the third PU on the second Link output in response to the first logic state of a first enable signal;

circuitry for selectively coupling a third output signal received on the second Link input from the third PU or the first output signal from the first PU to the second PU on the first Link output in response to the first logic state of a second enable signal; and circuitry for coupling the third output signal received on the second Link to an input of the first PU or selectively coupling the second output signal on the first Link input from the second PU when the first enable signal has the first logic state.

7. The bi-directional bus of claim 6, wherein the first Link input and a first function output from function logic circuitry are coupled to communication logic circuitry generating a first function output signal on the first Link output and a first communication output signal on a first communication output.

8. The bi-directional bus of claim 7, wherein the second Link input and the first communication output are coupled to the function logic circuitry generating a second function output signal on the first Link output and a second function output signal on a first function output.

9. The bi-directional bus of claim 8, wherein the first communication output signal is generated as a logic combination of the second output signal from the second PU and the first enable signal in a first logic gate.

10. The bi-directional bus of claim 9, wherein the first function output signal is generated as a logic combination of the second function signal and the second enable signal in a second logic gate.

11. The bi-directional bus of claim 10, wherein the second function signal is generated as a logic combination of the first communication signal and the first output signal in a third logic gate.

12. The bi-directional bus of claim 11, wherein the second function signal is generated as the logic combination of the second function signal and the third output signal in a fourth logic gate.

13. The bi-directional bus of claim 7, wherein the input of the first PU is coupled to the first function output of the function logic circuit.

14. The bi-directional bus of claim 12, wherein the first and second logic gates are AND logic gates.

15. The bi-directional bus of claim 12, wherein the third and fourth logic gates are OR logic gates.

16. The bi-directional bus of claim 6, wherein bi-directional communication between the first and second PU are enabled by setting both the first and second enable signals to a logic one.

17. The bi-directional bus of claim 6, wherein the first and second PUs are pattern detection processing units, each for comparing an input data byte to a pattern byte selected for a sequence of pattern bytes stored in each of the first and second PUs and generating a compare output in each of the first and second PUs, wherein the pattern byte in each of the PUs is selected by an address pointer and modified in response to a logic state of the compare output and an operation code stored with the selected pattern byte.

18. The bi-directional bus of claim 17, wherein the bi-directional communication between the first PU and the second PU is enabled to allow increment signals from the first and second PU, for incrementing their respective address pointers, to be coupled to and logic combined in the control logic of the first PU and control logic of the second PUs to generate a modified increment address pointer signal at the PU input of the first PU and the one or more adjacent PUs.

19. The bi-directional bus of claim 18, wherein the modified increment address pointer signal is used to enable advanced matching capabilities to be performed by the first and second PU by incrementing the address pointer in the first PU or the second PU if either the first or second PU generates a logic state on its corresponding compare output indicating that a particular input data byte has compared to either selected pattern byte in the first or second PU.

20. A data processing system comprising:
a central processing unit (CPU);
a random access memory (RAM);
one or more parallel pattern detection engines (PPDEs);
a bus coupling the CPU, RAM, and the one or more PPDEs, wherein each of the PPDEs has an input/output (I/O) interface for coupling data into and out of the PPDEs, M pattern detection processing units (PUs), and a cascade system for providing a bi-directional communication bus circuitry in each of M PUs for bi-directional communication between a first processing unit (PU) and a second and third PU each adjacent to the first PU and within the M PUs, wherein the first PU is physically coupled to the second PU with a first Link input and a first Link output and to the third PU with a second Link input and a second Link output comprising:

circuitry for coupling a first output signal from an output of the first PU to the third PU on the second Link output or selectively coupling a second output signal received on the first Link input from the second PU to the third PU on the second Link output in response to the first logic state of a first enable signal;

circuitry for selectively coupling a third output signal received on the second Link input from the third PU or the first output signal from the first PU to the second PU on the first Link output in response to the first logic state of a second enable signal; and circuitry for coupling the third output signal received on the second Link to an input of the first PU or selectively coupling the second output signal on the first Link input from the second PU when the first enable signal has the first logic state.

21. The data processing system of claim 20, wherein the first Link input and a first function output from function logic circuitry are coupled to communication logic circuitry generating a first function output signal on the first Link output and a first communication output signal on a first communication output.

22. The data processing system of claim 21, wherein the second Link input and the first communication output are coupled the function logic circuitry generating a second function output signal on the first Link output and a second function output signal on a first function output.

23. The data processing system of claim 22, wherein the first communication output signal is generated as a logic combination of the second output signal from the second PU and the first enable signal in a first logic gate.

24. The data processing system of claim 23, wherein the first function output signal is generated as a logic combination of the second function signal the and the second enable signal in a second logic gate.

25. The data processing system of claim 24, wherein the second function signal is generated as a logic combination of the first communication signal and the first output signal in a third logic gate.

26. The data processing system of claim 25, wherein the second function signal is generated as the logic combination of the second function signal and the third output signal in a fourth logic gate.

27. The data processing system of claim 21, wherein the input of the first PU is coupled to the first function output of the function logic circuit.

28. The data processing system of claim 26, wherein the first and second logic gates are AND logic gates.

29. The data processing system of claim 26, wherein the third and fourth logic gates are OR logic gates.

30. The data processing system of claim 20, wherein bi-directional communication between the first and second PU are enabled by setting both the first and second enable signals to a logic one.

31. The data processing system of claim 20, wherein the first and second PUs are pattern detection processing units, each for comparing an input data byte to a pattern byte selected for a sequence of pattern bytes stored in each of the first and second PUs and generating a compare output in each of the first and second PUs, wherein the pattern byte in each of the PUs is selected by an address pointer and modified in response to a logic state of the compare output and an operation code stored with the selected pattern byte.

32. The data processing system of claim 31, wherein the bi-directional communication between the first PU and the second PU is enabled to allow increment signals from the first and second PU, for incrementing their respective address pointers, to be coupled to and logic combined in the control logic of the first PU and control logic of the second PUs to generate a modified increment address pointer signal at the PU input of the first PU and the one or more adjacent PUs.

33. The data processing system of claim 32, wherein the modified increment address pointer signal is used to enable advanced matching capabilities to be performed by the first and second PU by incrementing the address pointer in the first PU or the second PU if either the first or second PU generates a logic state on its corresponding compare output indicating that a particular input data byte has compared to either selected pattern byte in the first or second PU.

34. A processing unit (PU) bi-directional communication bus coupling a processing unit PU(N) and a first adjacent PU(N−1) and second adjacent PU(N+1) within a group of M PUs, wherein each PU(N) has a bus circuit (BC) and a BC(N) in PU(N) is physically coupled to a BC(N−1) in PU(N−1) with a first Link input and a first Link output and BC(N) is coupled to a BC(N+1) in PU(N+1) with a second Link input and a second Link output, wherein BC(N) comprises:

function logic receiving a PU output signal PUO(N) from P(N), a first gated communication signal (GCS 1) from PU(N−1), and a first communication signal (CS1) from PU(N+1) on the second Link input and generating a second communication signal (CS2) on the second Link output and a second gated communication signal (GCS2), wherein CS2 is a logic combination of the PUO(N) and GCS1 and GCS2 is a first logic combination of the CS1 and CS2; and communication logic receiving a third communication signal (GS3) from the PU(N−1) and GCS2 and generating a fourth communication signal (GS4) on the first Link output and generating GCS1, wherein CS4 is a second logic combination of GCS2 and a logic state of a chain out signal and GCS1 is a logic combination of CS3 and a first chain in signal and wherein GCS2 is coupled to the PU(N) as a first PU input signal PUI(N).

35. The bi-directional bus of claim 34, wherein CS4 is generated as a logic AND combination of GCS2 and a logic state of the chain out signal and GCS1 is generated as a logic AND combination of CS3 and a logic state of the chain in signal.

36. The bi-directional bus of claim 34 wherein CS2 is generated as a logic OR combination of GCS1 and PUO(N) and GCS2 is generated as a logic OR combination of CS2 and CS1.

37. The bi-directional bus of claim 36, wherein GCS2 is coupled as an input signal to PU(N).

38. The bi-directional bus of claim 36, wherein the M PUs are pattern detection processing units, each for comparing input data to selected pattern data from pattern data stored in each of the M PUs and generating a compare output in each of the M PUs, wherein the selected pattern data in each of the M PUs is selected by an address pointer that is modified in response to a logic state of the compare output and an operation code stored with the selected pattern data.

* * * * *